US011245615B2

(12) United States Patent
Liu et al.

(10) Patent No.: US 11,245,615 B2
(45) Date of Patent: Feb. 8, 2022

(54) METHOD FOR DETERMINING LINK STATE, AND DEVICE

(71) Applicant: Huawei Technologies Co., Ltd., Shenzhen (CN)

(72) Inventors: Heyang Liu, Nanjing (CN); Qinghua Yan, Beijing (CN); Hewen Zheng, Nanjing (CN); Tao Ma, Beijing (CN); Jinfeng Yan, Nanjing (CN); Xinggui Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 16/697,714

(22) Filed: Nov. 27, 2019

(65) Prior Publication Data

US 2020/0099609 A1  Mar. 26, 2020

Related U.S. Application Data

(63) Continuation of application No. PCT/CN2018/086053, filed on May 8, 2018.

(30) Foreign Application Priority Data

May 31, 2017 (CN) .......................... 201710399830.X

(51) Int. Cl.
*H04L 12/721* (2013.01)
*H04L 12/26* (2006.01)
(Continued)

(52) U.S. Cl.
CPC ............ *H04L 45/123* (2013.01); *H04L 43/10* (2013.01); *H04L 45/02* (2013.01); *H04L 45/22* (2013.01);
(Continued)

(58) Field of Classification Search
CPC combination set(s) only.
See application file for complete search history.

(56) References Cited

U.S. PATENT DOCUMENTS

| 11,121,967 | B2 * | 9/2021 | Li | H04L 45/021 |
| 2007/0091796 | A1 * | 4/2007 | Filsfils | H04L 45/28 |
| | | | | 370/228 |

(Continued)

FOREIGN PATENT DOCUMENTS

| CN | 101065677 A | 10/2007 |
| CN | 101631130 A | 1/2010 |

(Continued)

OTHER PUBLICATIONS

Rekhter, Y. et al., "A Border Gateway Protocol 4 (BGP-4)," Network Working Group, Request for Comments: 4271, Obsoletes: 177, Category: Standards Track, Jan. 2006, 104 pages.

(Continued)

*Primary Examiner* — Xavier S Wong
(74) *Attorney, Agent, or Firm* — Slater Matsil, LLP

(57) ABSTRACT

In a method, a controller sends a first route update packet including a first route to a first forwarding device, so that the first forwarding device sends a third route update packet including a third route to at least one target forwarding device; a second forwarding device receives the third route update packet, determines a target link from the first forwarding device to the second forwarding device, and sends, based on a monitored state of the target link, a second route update packet including a second route and a target field to the controller; and the controller determines the state of the target link based on the target field in the second route update packet.

15 Claims, 7 Drawing Sheets

(51) Int. Cl.
*H04L 12/751* (2013.01)
*H04L 12/707* (2013.01)
*H04L 12/709* (2013.01)
*H04L 12/703* (2013.01)
*H04L 29/08* (2006.01)

(52) U.S. Cl.
CPC ............ *H04L 45/245* (2013.01); *H04L 45/26* (2013.01); *H04L 45/28* (2013.01); *H04L 69/329* (2013.01)

(56) References Cited

U.S. PATENT DOCUMENTS

| | | | |
|---|---|---|---|
| 2013/0272310 A1 | 10/2013 | Suzuki et al. | |
| 2016/0072695 A1* | 3/2016 | Yu ........................... | H04L 45/74 370/392 |
| 2016/0277959 A1 | 9/2016 | Venkataraman et al. | |
| 2017/0171058 A1 | 6/2017 | Wang | |

FOREIGN PATENT DOCUMENTS

| | | |
|---|---|---|
| CN | 103281247 A | 9/2013 |
| CN | 103684835 A | 3/2014 |
| CN | 105591937 A | 5/2016 |
| CN | 107637031 A | 1/2018 |
| WO | 2011015011 A1 | 2/2011 |
| WO | 2016029862 A1 | 3/2016 |

OTHER PUBLICATIONS

Scudder, J. et al., "BGP Monitoring Protocol (BMP)," Internet Engineering Task Force (IETF), Request for Comments: 7854, Category: Standards Track, ISSN: 2070-1721, Jun. 2016, 27 pages.
P. Lapukhov et al. "Centralized Routing Control in BGP Networks Using Link-State Abstraction", draft-lapukhov-bgp-sdn-00, Sep. 2, 2013, 27 pages.
The TCP_IP Guide—"IP Datagram Options and Option Format, Retrieved" from the internet at http://www.tcpipguide.com/free/t_IPDatagramOptionsandOptionFormat.htm, on Feb. 13, 2020, 2 pages.
Ari Fogel et al., "Proactive Network Configuration Validation with Batfish", retrieved from the internet at https://archive.hanog.org/sites/default/files/wednesday_general_fogel_batfish.pdf, on Feb. 13, 2020, 21 pages.

\* cited by examiner

METHOD FOR DETERMINING LINK STATE, AND DEVICE

CROSS-REFERENCE TO RELATED APPLICATIONS

This application is a continuation of International Application No. PCT/CN2018/086053, filed on May 8, 2018, which claims priority to Chinese Patent Application No. 201710399830.X, filed on May 31, 2017. The disclosures of the aforementioned applications are hereby incorporated by reference in their entireties.

TECHNICAL FIELD

This application relates to the field of communications technologies, and in particular, to a method for determining a link state, and a device

BACKGROUND

In some scenarios, communications networks (for example, a data center (DC) network) need to have functions such as centralized data switching and heavy east-to-west data traffic. Therefore, the communications networks have features such as large scales, high scalability, and high robustness. To be specific, all the communications networks have large quantities of forwarding devices (for example, switches), to forward data of servers. Examples of such networks are a data center network based on a Clos architecture and a data center network based on a mesh (mesh)$^2$ architecture.

Because a quantity of forwarding devices in a communications network is large, a quantity of links in the communications network is also relatively large. A link is a physical line from a forwarding device (node) to a neighboring forwarding device, and there is no other forwarding device on the link. For example, in the large-scale data center networks of the two architectures, a link scale reaches above 200 K. In a scenario in which a centralized management method is used for a communications network, how a controller monitors states of a relatively large quantity of links in the communications network is a problem urgently to be resolved in the communications field.

A conventional link monitoring method is as follows.

A controller periodically sends a route update packet to a forwarding device R1. Every time the controller sends a route update packet, the controller starts a timer to start timing for the route update packet, and the route update packet has an attribute of one transmission hop (one-hop).

After receiving a route update packet, the R1 changes an attribute of the route update packet to no-export, and sends the route update packet to a forwarding device R2 neighboring to the R1.

After receiving the route update packet, the R2 sends the route update packet to the controller.

The controller determines whether the route update packet is received before the timer expires; and if the route update packet is received before the timer expires, the controller determines that a state of a link between the R1 and the R2 is normal; or if the route update packet is not received before the timer expires, the controller determines that a state of a link between the R1 and the R2 is faulty.

As can be learned from the descriptions about the conventional link monitoring method, in the method, the controller periodically sends a route update packet to each forwarding device to monitor a state of a link between each forwarding device and a neighboring device. When a quantity of forwarding devices in the communications network is relatively large, the controller sends route update packets excessively frequently, and this further causes a problem that a load of the controller is excessively high.

SUMMARY

This application provides a method for determining a link state, and a device, to resolve a problem that a controller sends route update packets excessively frequently in a conventional link monitoring method.

According to a first aspect, an embodiment of this application provides a method for determining a link state, where the method is applicable to a communications network shown in FIG. 1, and the method includes the following steps.

First, a controller sends a first route update packet to a first forwarding device, where the first route update packet includes a first route and a first attribute indication message about the first route, a prefix of the first route is an identifier of the first forwarding device, and the first attribute indication message is used to indicate one transmission hop of the first route; when the controller receives a second route update packet sent by a second forwarding device and determines that a prefix of a second route included in the second route update packet is the identifier of the first forwarding device, the controller determines, based on the identifier of the first forwarding device and a source address of the second route update packet, that a target link is a link from the first forwarding device to the second forwarding device; and finally, the controller determines a state of the target link based on a target field in the second route update packet, where the target field is used to notify the controller of the state of the target link.

In the method, the controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

In a possible design, the source address is an Internet Protocol IP address.

The route update packet may be encapsulated in an IP packet for transmission in the communications network. Therefore, the source address of the second route update packet is an IP address of the second forwarding device. In the design, the controller may determine, based on the IP address of the second forwarding device, that an endpoint of the target link is the second forwarding device.

In a possible design, the identifier of the first forwarding device may be information that can uniquely identify the first forwarding device, such as a number, a name, an IP address, or a MAC address of the first forwarding device.

In a possible design, the target field includes type information indicating a type of the second route update packet; and in this case, the controller may determine the state of the target link based on the target field by performing the following step.

When determining that the type of the second route update packet indicated by the type information is a route addition type, the controller determines that the state of the target link is normal; or when determining that the type of the second route update packet indicated by the type information is a route deletion type, the controller determines that the state of the target link is faulty, where the second route update packet of the route addition type is used to instruct the controller to add the second route, and the second route update packet of the route deletion type is used to instruct the controller to delete the second route.

In the design, the controller may determine the state of the target link based on the type of the second route update packet.

In a possible design, the target field includes a state identifier indicating the state of the target link; and in this case, the controller may determine the state of the target link based on the target field by performing the following step.

When determining that the state identifier is a normal state identifier, the controller determines that the state of the target link is normal; or when determining that the state identifier is a faulty state identifier, the controller determines that the state of the target link is faulty.

In the design, the controller may determine the state of the target link based on the state identifier in the second route update packet.

In a possible design, the target field includes a bandwidth of the target link; and in this case, the controller may determine the state of the target link based on the target field by performing the following step.

When determining that the target field exists in the second route update packet, the controller determines that the state of the target link is normal.

In the design, the controller may determine the state of the target link based on the bandwidth of the target link in the second route update packet.

In a possible design, the controller may further determine that the bandwidth of the target link is the bandwidth of the target link included in the target field.

In the design, the controller may determine not only the state of the target link but also the bandwidth of the target link.

In a possible design, the target field includes a bandwidth of the target link; and in this case, the controller may determine the state of the target link based on the target field by performing the following step.

The controller obtains the bandwidth of the target link included in the target field; and when determining that the bandwidth of the target link is greater than 0, the controller determines that the state of the target link is normal; or when determining that the bandwidth of the target link is equal to 0, the controller determines that the state of the target link is faulty.

In the design, the controller may determine the state of the target link based on the bandwidth of the target link in the second route update packet.

In a possible design, the controller may send the first route update packet to the first forwarding device by performing the following step: The controller sends the first route update packet to the first forwarding device by using the Internal Border Gateway Protocol IBGP; and in this case, the controller may receive, by performing the following step, the second route update packet sent by the second forwarding device. The controller receives, by using the IBGP, the second route update packet sent by the second forwarding device.

In the design, when the communications network uses a BGP route advertisement mechanism, transmission of a route update packet between the controller and the forwarding device can be implemented.

According to a second aspect, an embodiment of this application provides a method for determining a link state, where the method is applicable to a communications network shown in FIG. 1, and the method includes the following steps.

First, a first forwarding device receives a first route update packet sent by a controller, where the first route update packet includes a first route and a first attribute indication message about the first route, a prefix of the first route is an identifier of the first forwarding device, and the first attribute indication message is used to indicate one transmission hop of the first route; and then the first forwarding device sends, based on the first attribute indication message, a third route update packet to at least one target forwarding device that has a link to the first forwarding device, where the third route update packet includes a third route and a second attribute indication message about the third route, a prefix of the third route is the identifier of the first forwarding device, and the second attribute indication message is used to instruct the forwarding device receiving the third route update packet not to advertise the third route to another forwarding device any longer.

In the method, after receiving the first route update packet sent by the controller, the first forwarding device may send the third route update packet to the at least one target forwarding device that has a link to the first forwarding device, to trigger the at least one target forwarding device to start to monitor a state of a target link (from the first forwarding device to the at least one target forwarding device), so that a second forwarding device can notify the controller of the monitored state of the target link by using a second route update packet.

In a possible design, the first forwarding device generates the second attribute indication message based on the first attribute indication message, generates the third route update packet carrying the second attribute indication message and the third route, and finally sends the third route update packet to the at least one target forwarding device based on the indication of the first attribute indication message.

In a possible design, the third route may be the same as the first route, or is generated by modifying other information in the first route than the prefix.

In the design, it can be ensured that the prefix of the third route is the same as the prefix of the first route.

In a possible design, the first forwarding device belongs to a first autonomous system, each of the at least one target forwarding device belongs to a second autonomous system, the second autonomous system is different from the first autonomous system, and any two of the at least one target forwarding device belong to different second autonomous systems.

In the design, in a scenario in which a forwarding device is deployed in a form of an autonomous system in the communications network, transmission of a route update packet between forwarding devices in different autonomous systems can be ensured.

In a possible design, the first forwarding device may receive, by performing the following step, the first route update packet sent by the controller. The first forwarding device receives, by using the Internal Border Gateway Protocol IBGP, the first route update packet sent by the controller; and in this case, the first forwarding device may send the third route update packet to the at least one target forwarding device by performing the following step. The first forwarding device sends the third route update packet to the at least one target forwarding device by using the External Border Gateway Protocol EBGP.

In the design, when the communications network uses a BGP route advertisement mechanism, transmission of a route update packet between different forwarding devices can be implemented.

According to a third aspect, an embodiment of this application provides a method for determining a link state, where the method is applicable to a communications network shown in FIG. 1, and the method includes the following steps.

First, a second forwarding device receives a third route update packet sent by a first forwarding device and including a second attribute indication message, where the third route update packet further includes a third route, a prefix of the third route is an identifier of the first forwarding device, and the second attribute indication message is used to instruct the forwarding device receiving the third route update packet not to advertise the third route to another forwarding device any longer; then the second forwarding device determines that a target link is a link from the first forwarding device to the second forwarding device, and monitors a state of the target link; and finally, the second forwarding device sends a second route update packet to a controller based on the monitored state of the target link, where the second route update packet includes a second route and a target field used to notify the controller of the state of the target link, and a prefix of the second route is the identifier of the first forwarding device.

In the method, the second forwarding device starts to monitor the state of the target link when triggered by the received third route update packet sent by the first forwarding device. In this way, the second forwarding device notifies the controller of the monitored state of the target link by using the second route update packet.

In a possible design, after determining the target link, the second forwarding device may enable a link state monitoring function, and then start to monitor the state of the target link.

In a possible design, the second forwarding device may enable the link state monitoring function after receiving a monitoring instruction sent by the controller, and start to monitor the state of the target link when triggered by the third route update packet.

In a possible design, the second route may be the same as the third route, or is generated by modifying other information in the third route than the prefix.

In the design, it can be ensured that the prefix of the second route is the same as the prefix of the third route.

In a possible design, the second forwarding device may determine the target link in the following manners.

In a first manner, the second forwarding device determines a port for receiving the third route update packet, and determines the target link with the port as an endpoint.

In a second manner, the second forwarding device determines that a link with the port as an endpoint is a member link in a link aggregation group, and determines that the target link is the link aggregation group, where the link aggregation group includes a plurality of member links.

In the design, the second forwarding device can accurately determine the target link.

In a possible design, when the target link is the link aggregation group, that the second forwarding device monitors a state of the target link includes: when determining that a state of at least one member link in the link aggregation group is normal, the second forwarding device detects that the state of the target link is normal; or when determining that states of all member links in the link aggregation group are faulty, the second forwarding device detects that the state of the target link is faulty.

In the design, the second forwarding device can accurately determine the state of the target link.

In a possible design, the second forwarding device may monitor, by monitoring a signal (for example, an electrical signal or an optical signal) on the target link, or an interrupt message for the target link (or the member links in the target link), whether the state of the target link is normal or faulty.

In a possible design, the target field includes type information indicating a type of the second route update packet; and in this case, the second forwarding device may send the second route update packet to the controller based on the state of the target link by using the following two methods.

In a first method, when determining that the state of the target link is normal, the second forwarding device sends the second route update packet to the controller, where the type information included in the target field indicates that the type of the second route update packet is a route addition type; or when determining that the state of the target link is faulty, the second forwarding device sends the second route update packet to the controller, where the type information included in the target field indicates that the type of the second route update packet is a route deletion type.

In a second method, when determining that the state of the target link changes from faulty to normal, the second forwarding device sends the second route update packet to the controller, where the type information included in the target field indicates that the type of the second route update packet is a route addition type; or when determining that the state of the target link changes from normal to faulty, the second forwarding device sends the second route update packet to the controller, where the type information included in the target field indicates that the type of the second route update packet is a route deletion type.

The second route update packet of the route addition type is used to instruct the controller to add the second route, and the second route update packet of the route deletion type is used to instruct the controller to delete the second route.

In the design, the second forwarding device may notify the controller of the state of the target link by using the type of the second route update packet.

In a possible design, the target field includes a state identifier indicating the state of the target link; and in this case, the second forwarding device may send the second route update packet to the controller based on the state of the target link by using the following two methods:

In a first method, when determining that the state of the target link is normal, the second forwarding device sends the second route update packet to the controller, where the state identifier included in the target field is a normal state identifier; or when determining that the state of the target link is faulty, the second forwarding device sends the second route update packet to the controller, where the state identifier included in the target field is a faulty state identifier.

In a second method, when determining that the state of the target link changes from faulty to normal, the second forwarding device sends the second route update packet to the controller, where the state identifier included in the target field is a normal state identifier; or when determining that the state of the target link changes from normal to faulty, the second forwarding device sends the second route update packet to the controller, where the state identifier included in the target field is a faulty state identifier.

In the method, the second forwarding device may notify the controller of the state of the target link by using the state identifier in the second route update packet.

In a possible design, the target field includes a bandwidth of the target link; and in this case, the second forwarding device may send the second route update packet to the controller based on the state of the target link by using the following methods.

In a second method, when determining that the state of the target link is normal, the second forwarding device determines the bandwidth of the target link, and sends the second route update packet to the controller, where the bandwidth of the target link included in the target field is greater than 0; or when determining that the state of the target link is faulty, the second forwarding device sends the second route update packet not including the target field to the controller.

In a second method, when determining that the state of the target link is normal, the second forwarding device determines the bandwidth of the target link, and sends the second route update packet to the controller, where the bandwidth of the target link included in the target field is greater than 0; or when determining that the state of the target link is faulty, the second forwarding device sends the second route update packet to the controller, where the bandwidth of the target link included in the target field is equal to 0.

In the design, the second forwarding device may notify the controller of the state of the target link by using the bandwidth of the link in the second route update packet.

In a possible design, when the target link is the link aggregation group, the second forwarding device may determine the bandwidth of the target link by performing the following step.

The second forwarding device determines member links whose states are normal in the plurality of member links, and determines that the bandwidth of the target link is equal to a sum of bandwidths of the member links whose states are normal.

In the design, the second forwarding device can accurately determine the bandwidth of the target link.

In a possible design, the target field includes a bandwidth of the target link; and in this case, when the target link is the link aggregation group, the second forwarding device may send the second route update packet to the controller based on the state of the target link by performing the following step.

When determining that the state of the target link is normal, and that a member link whose state is normal in the target link changes, the second forwarding device determines the bandwidth of the target link, and sends the second route update packet to the controller.

In the design, the second forwarding device may notify the controller of the state of the target link by using the bandwidth of the link in the second route update packet. In addition, when a member link whose state is normal in the target link changes, the second forwarding device may further notify the controller of a changed bandwidth of the target link by using the second route update packet.

In a possible design, the second forwarding device determines the bandwidth of the target link by performing the following step.

The second forwarding device determines member links whose states are normal in the plurality of member links, and determines that the bandwidth of the target link is equal to a sum of bandwidths of the member links whose states are normal.

In the design, the second forwarding device can accurately determine the bandwidth of the target link.

In a possible design, the first forwarding device belongs to a first autonomous system, the second forwarding device belongs to a second autonomous system, and the first autonomous system is different from the second autonomous system.

In the design, in a scenario in which a forwarding device is deployed in a form of an autonomous system in the communications network, transmission of a route update packet between forwarding devices in different autonomous systems can be ensured.

In a possible design, the second forwarding device may receive, by performing the following step, the third route update packet sent by the first forwarding device. The second forwarding device receives, by using the External Border Gateway Protocol EBGP, the third route update packet sent by the first forwarding device; and in this case, the second forwarding device may send the second route update packet to the controller by performing the following step. The second forwarding device sends the second route update packet to the controller by using the Internal Border Gateway Protocol IBGP.

In the design, when the communications network uses a BGP route advertisement mechanism, transmission of a route update packet between the forwarding device and the controller can be implemented.

According to a fourth aspect, an embodiment of this application further provides a controller, where the controller has a function for implementing the controller in the foregoing method example. The function may be implemented by hardware, or may be implemented by corresponding software executed by hardware. The hardware or software includes one or more modules corresponding to the function.

In a possible design, a structure of the controller includes a sending unit, a processing unit, and a receiving unit. The units may perform corresponding functions in the foregoing method example. For details, refer to detailed descriptions in the method example. Details are not described herein.

In a possible design, a structure of the controller includes a communications interface, a processor, and a memory, where the communications interface is configured to receive and send data, and the processor is configured to support the controller in performing corresponding functions in the foregoing method. The memory is coupled with the processor. The memory stores a program instruction and data required by the processor.

According to a fifth aspect, an embodiment of this application further provides a first forwarding device, where the first forwarding device has a function for implementing the first forwarding device in the foregoing method example. The function may be implemented by hardware, or may be implemented by corresponding software executed by hardware. The hardware or software includes one or more modules corresponding to the function.

In a possible design, a structure of the first forwarding device includes a receiving unit, a processing unit, and a sending unit. The units may perform corresponding functions in the foregoing method example. For details, refer to detailed descriptions in the method example. Details are not described herein.

In a possible design, a structure of the first forwarding device includes a communications interface, a processor, and a memory, where the communications interface is configured to receive and send data, and the processor is configured to support the first forwarding device in performing corresponding functions in the foregoing method. The memory is coupled with the processor. The memory stores a program instruction and data required by the processor.

According to a sixth aspect, an embodiment of this application further provides a second forwarding device, where the second forwarding device has a function for implementing the second forwarding device in the foregoing method example. The function may be implemented by hardware, or may be implemented by corresponding software executed by hardware. The hardware or software includes one or more modules corresponding to the function.

In a possible design, a structure of the second forwarding device includes a receiving unit, a processing unit, and a sending unit. The units may perform corresponding functions in the foregoing method example. For details, refer to detailed descriptions in the method example. Details are not described herein.

In a possible design, a structure of the second forwarding device includes a communications interface, a processor, and a memory, where the communications interface is configured to receive and send data, and the processor is configured to support the second forwarding device in performing corresponding functions in the foregoing method. The memory is coupled with the processor. The memory stores a program instruction and data required by the processor.

According to a seventh aspect, an embodiment of this application further provides a computer-readable storage medium, where the computer-readable storage medium is configured to store a computer software instruction for executing a function of any one of the foregoing aspects and any one of the designs of the foregoing aspects, and the computer software instruction includes a program designed to execute the method in any one of the foregoing aspects and any one of the designs of the foregoing aspects.

According to an eighth aspect, an embodiment of this application further provides a computer program product including an instruction, and when the computer program product runs on a computer, the computer performs the method in any one of the foregoing aspects.

In the solutions provided by the embodiments of this application, a controller in a communications network sends a first route update packet to a first forwarding device, where the first route update packet includes a first route whose prefix is an identifier of the first forwarding device, and a first attribute indication message indicating one transmission hop of the first route; the first forwarding device sends, based on the first attribute indication message in the received first route update packet, a third route update packet to at least one target forwarding device that has a link to the first forwarding device, where the third route update packet includes a third route whose prefix is the identifier of the first forwarding device, and a second attribute indication message instructing the forwarding device receiving the third route update packet not to advertise the third route to another forwarding device any longer; after receiving the third route update packet, the second forwarding device in the at least one target forwarding device determines a target link from the first forwarding device to the second forwarding device, monitors a state of the target link, and sends a second route update packet to the controller based on the monitored state of the target link, where the second route update packet includes a second route whose prefix is the identifier of the first forwarding device, and a target field notifying the controller of the state of the target link; and after receiving the second route update packet, the controller may determine the target link based on the identifier of the first forwarding device and a source address of the second route update packet, and determine the state of the target link based on the target field in the second route update packet. In the foregoing method, the controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

DETAILED DESCRIPTION OF ILLUSTRATIVE EMBODIMENTS

Figure 1:
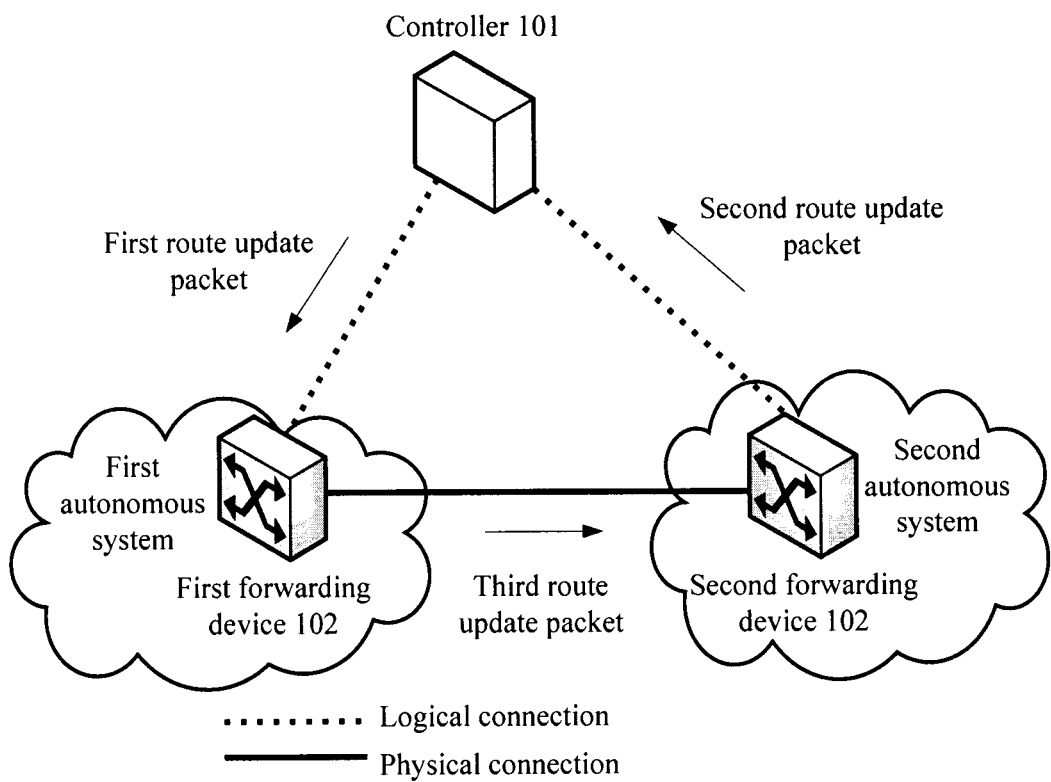
FIG. 1 is a schematic diagram of a communications network according to an embodiment of this application.

This application provides a method for determining a link state, and a device, to resolve a problem that a controller sends route update packets excessively frequently in a conventional link monitoring method. The method and the device are based on a same inventive concept. The method and the device have similar principles for resolving the problem. Therefore, mutual reference may be made for implementations of the device and the method, and details of repeated parts are not described.

In the solutions provided by the embodiments of this application, a controller in a communications network sends a first route update packet to a first forwarding device, where the first route update packet includes a first route whose prefix is an identifier of the first forwarding device, and a first attribute indication message indicating one transmission hop of the first route; the first forwarding device sends, based on the first attribute indication message in the received first route update packet, a third route update packet to at least one target forwarding device that has a link to the first forwarding device, where the third route update packet includes a third route whose prefix is the identifier of the first forwarding device, and a second attribute indication message instructing the forwarding device receiving the third route update packet not to advertise the third route to another forwarding device any longer; after receiving the third route update packet, the second forwarding device in the at least one target forwarding device determines a target link from the first forwarding device to the second forwarding device, monitors a state of the target link, and sends a second route update packet to the controller based on the monitored state of the target link, where the second route update packet includes a second route whose prefix is the identifier of the first forwarding device, and a target field notifying the controller of the state of the target link; and after receiving the second route update packet, the controller may determine the target link based on the identifier of the first forwarding device and a source address of the second route update packet, and determine the state of the target link based on the target field in the second route update packet. In the foregoing method, the controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

The following explains some terms in this application to facilitate understanding by a person skilled in the art.

1. In the communications network in this application, links are established between forwarding devices to implement data transmission between a plurality of servers. Usually, the communications network includes a plurality of servers and a plurality of forwarding devices. Optionally, the communications network may be implemented by using a plurality of architectures, for example, a Clos architecture or a mesh² architecture. Depending on a specific application scenario, the communications network may be a data center network, the Internet, or the like. This is not limited in this application.

Because centralized management is used for the communications network, the communications network further includes a controller. A logical connection exists between the controller and each forwarding device in the communications network, so that the forwarding devices and the links in the communications network can be controlled and managed.

2. A forwarding device in this application implements data forwarding by using a stored routing entry. The forwarding device has a route learning function. Therefore, the controller in the communications network may transmit a to-be-advertised route to the forwarding device by using a route update packet. After receiving the route update packet, the forwarding device may obtain the route in the route update packet, generate a routing entry, and store the routing entry in a routing table. Optionally, the forwarding device may be a switch, or another network device having a function of a switch, for example, a router. This is not limited in this application.

3. An autonomous system (AS) in this application includes at least one forwarding device. An autonomous system may autonomously determine a routing protocol to be used by a forwarding device in the system to perform data transmission. Transmission between autonomous systems further needs to be implemented by using a conventional routing entry. Therefore, an autonomous system may be considered as a "forwarding device". In the communications system, an autonomous system may be disposed to extend work performance of a forwarding device. To be specific, work performance of the autonomous system is higher than work performance of each forwarding device in the autonomous system.

4. A route update packet in the embodiments of this application is a packet used in the conventional route advertisement mechanism to update a route stored in the forwarding device in the communications network. Obviously, the route update packet needs to carry an updated route.

Based on different specific route update operations, route update packets are classified into two types: a route addition type and a route deletion type. A route update packet of the route addition type is used to instruct a receiving device to add a route included in the route update packet or replace an existing route (e.g., generate a routing entry based on the route, and store the routing entry). A route update packet of the route deletion type is used to instruct a receiving device to delete a route included in the route update packet (e.g., delete a routing entry generated based on the route from stored routing entries).

Optionally, the type of the route update packet may be indicated by type information included in a field specified in the route update packet.

Optionally, the route update packet may be encapsulated in an IP packet for transmission in the communications network.

5. A route in the embodiments of this application is a routing rule used for generating a routing entry. The route specifies information about a destination network or a destination device and information about a next hop. The specified information about the destination network or the destination device is a prefix of the route.

6. A first attribute indication message included in a route update packet in the embodiments of this application is used to indicate one transmission hop (one-hop) of a route included in the route update packet. To be specific, the first attribute indication message indicates that the route has a one-hop advertising transmission attribute. For example, a forwarding device a receiving the route update packet A needs to transmit the route (a route update packet B including the route) to a forwarding device b based on the first attribute indication message, where a link exists between the forwarding device b and the forwarding device a; but after receiving the route update packet B, the forwarding device b cannot advertise (or transmit) the route to another forwarding device any longer.

7. A second attribute indication message included in a route update packet in this application is used to instruct a forwarding device receiving the route update packet not to advertise a route included in the route update packet to another forwarding device any longer. To be specific, the second attribute indication message indicates that the route has a no-advertising (no-export) transmission attribute.

As can be learned from the descriptions about the first attribute indication message, after receiving the route update packet A including the route and the first attribute indication message, when transmitting the route to the forwarding device b, the forwarding device a needs to send the route update packet B including the route and the second attribute indication message to the forwarding device b, so that the forwarding device b does not advertise the route to another forwarding device any longer based on the second attribute indication message after the forwarding device b receives the route update packet B.

Obviously, in a route update process, the communications network needs to use both the first attribute indication message and the second attribute indication message to implement one transmission hop of the route.

It should be noted that, the second attribute indication message only forbids the forwarding device b to advertise the route to another forwarding device having an External Border Gateway Protocol (EBGP) connection to the forwarding device b, but does not forbid the forwarding device b to communicate with another device having an Internal Border Gateway Protocol (IBGP) connection to the forwarding device b. In other words, the second attribute indication message indicates that the forwarding device cannot advertise the route to another forwarding device, but the forwarding device may advertise the route to a non-forwarding device (e.g., controller).

8. A link in the embodiments of this application is a direct physical connection between two forwarding devices in the communications network, that is, there is no other intermediate device on the link. It should be noted that, from a macro perspective, a start point and an endpoint of the link are forwarding devices. From a micro perspective, because a forwarding device establishes a link to another forwarding device by using a port in the forwarding device, both the start point and the endpoint of the link are ports of the forwarding devices, but the two ports of the start point and the endpoint belong to different forwarding devices.

As can be learned from the descriptions about the link, the link has a direction. To be specific, a first link from a first forwarding device to a second forwarding device is different from a second link from the second forwarding device to the first forwarding device. A reason is as follows.

A start point of the first link is an output port (output port) of the first forwarding device, and an endpoint of the first link is an input port (input port) of the second forwarding device; but a start point of the second link is an output port of the second forwarding device, and an endpoint of the second link is an input port of the first forwarding device. Because the two links have different start points and different endpoints, the two links are different.

In a scenario in which a forwarding device is deployed in a form of an autonomous system in the communications network, a unique link exists between an autonomous system 1 and an autonomous system 2, where the link is a physical connection from a forwarding device in the autonomous system 1 to a forwarding device in the autonomous system 2.

9. A logical connection in the embodiments of this application is a communication connection between any two devices in the communications network. Another intermediate device may exist in the logical connection. In the communications network in the embodiments of this application, the controller has a logical connection to any forwarding device, and may directly communicate with each forwarding device, for example, send a route update packet.

It should be noted that, "a plurality of" in this application denotes two or more.

In addition, it should be understood that, terms such as "first" and "second" in the descriptions of this application are used only for description purposes and should not be understood as an indication or an implication of relative significance or as an indication or an implication of an order.

The following describes in detail the embodiments of this application with reference to accompanying drawings.

FIG. 1 shows a possible communications network to which a method for determining a link state is applicable according to an embodiment of this application. Referring to FIG. 1, the communications network includes a controller 101 and a plurality of forwarding devices 102 (such as a first forwarding device 102 and a second forwarding device 102 in the figure).

Certainly, the communications network further includes a plurality of servers, where each server is connected to a forwarding device. The server implements data transmission by using a forwarding device 102 in the communications network.

As shown in the figure, a logical connection exists between the controller 101 and a forwarding device 102 in the communications network, and a physical connection (or link) exists between two neighboring forwarding devices 102. When a quantity of forwarding devices in the communications network is large, a link scale in the communications network is also relatively large.

The controller 101 is configured to monitor a state of a link in the communications network. The following describes an example in which the controller 101 monitors a link from the first forwarding device 102 to the second forwarding device 102.

As shown in FIG. 1, a process in which the controller 101 monitors the link from the first forwarding device 102 to the second forwarding device 102 includes: the controller 101 sends a first route update packet to the first forwarding device 102, where the first route update packet includes a first route whose prefix is an identifier of the first forwarding device 102, and a first attribute indication message indicating one transmission hop of the first route; the first forwarding device 102 sends, based on the first attribute indication message in the received first route update packet, a third route update packet to at least one target forwarding device 102 (including the second forwarding device 102) that has a link to the first forwarding device 102, where the third route update packet includes a third route whose prefix is the identifier of the first forwarding device 102, and a second attribute indication message instructing the forwarding device 102 receiving the third route update packet not to advertise the third route to another forwarding device 102 any longer; after receiving the third route update packet, the second forwarding device 102 determines a target link from the first forwarding device 102 to the second forwarding device 102, monitors a state of the target link, and sends a second route update packet to the controller 101 based on the monitored state of the target link, where the second route update packet includes a second route whose prefix is the identifier of the first forwarding device 102, and a target field notifying the controller 101 of the state of the target link; and after receiving the second route update packet, the controller 101 may determine the target link based on the identifier of the first forwarding device 102 and a source address of the second route update packet, and determine the state of the target link based on the target field in the second route update packet.

In the communications network, the controller 101 may use a conventional route advertisement mechanism to determine a state of a link in the communications network and implement link monitoring, without configuring or adjusting a forwarding device 102. Because the controller 101 can determine the state of the target link only by sending the first route update packet to the first forwarding device 102, the controller 101 can monitor states of all links in the communications network by sending one first route update packet to each forwarding device 102 in the communications network. Therefore, the method can greatly reduce a frequency of sending route update packets by the controller 101, and can further reduce a load of the controller.

Optionally, in a scenario in which a forwarding device 102 is deployed in a form of an autonomous system in the communications network, the first forwarding device 102 and the second forwarding device 102 belong to different autonomous systems. As shown in FIG. 1, the first forwarding device 102 belongs to a first autonomous system, and the second forwarding device 102 belongs to a second autonomous system.

Optionally, when the communications network uses a Border Gateway Protocol (BGP) route advertisement mechanism, a logical connection between the controller 101 and the forwarding device 102 in the communications network is an Internal Border Gateway Protocol (IBGP) connection. A link (physical connection) between two forwarding devices 102 is an External Border Gateway Protocol (EBGP) connection.

Therefore, IBGP is used to implement communication between the controller 101 and the forwarding device 102. For example, the controller 101 sends the first route update packet to the first forwarding device 102 by using the IBGP, and receives the second route update packet sent by the second forwarding device 102. Correspondingly, the first forwarding device 102 also receives the first route update packet by using the IBGP, and the second forwarding device 102 also sends the second route update packet by using the IBGP.

EBGP is used to implement communication between two forwarding devices 102 between which a link exists. For example, the first forwarding device 102 sends the third route update packet to the at least one target forwarding device 102 by using the EBGP. Correspondingly, the second forwarding device in the at least one target forwarding device 102 also receives the third route update packet by using the EBGP.

Optionally, the communications network may be implemented by using a plurality of architectures, for example, a Clos architecture or a mesh$^2$ architecture. This is not limited in this embodiment of this application.

In addition, depending on a specific application scenario, the communications network may be a data center network, a local area network, or the like. This is not limited in this embodiment of this application.

Figure 2:
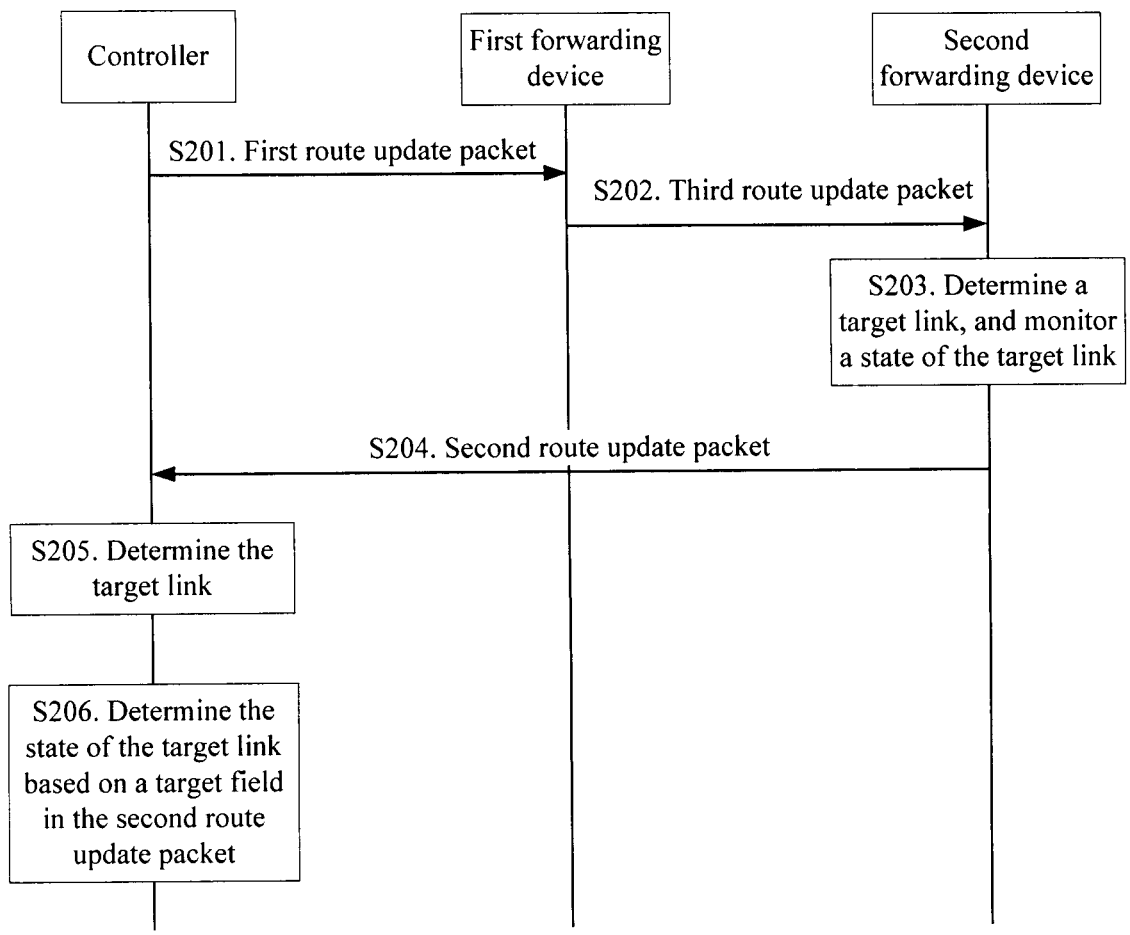
FIG. 2 is a flowchart of a method for determining a link state according to an embodiment of this application.

An embodiment of this application provides a method for determining a link state, where the method is applicable to the communications network shown in FIG. 1, and a first forwarding device in this embodiment of this application may be any forwarding device in the communications network. Referring to FIG. 2, a procedure of the method includes the following steps.

S201. A controller sends a first route update packet to a first forwarding device, where the first route update packet includes a first route and a first attribute indication message about the first route, a prefix of the first route is an identifier of the first forwarding device, and the first attribute indication message is used to indicate one transmission hop of the first route.

Correspondingly, the first forwarding device receives the first route update packet sent by the controller.

In the communications network, the controller may receive a plurality of route update packets. The controller needs to identify which of the route update packets are used to determine a state of a link with the first forwarding device as a start point. Therefore, the controller performs identification based on a prefix of a route carried in a route update packet. In this way, after receiving the route update packet, the controller may determine, based on the prefix of the route carried in the route update packet, which forwarding device is the start point of the link.

Optionally, the prefix of the first route may be conventional information about a destination network or a destination device, and the controller may use the information about the destination network or the destination device as the identifier of the first forwarding device.

Optionally, the controller may determine the identifier of the first forwarding device, and construct the first route based on the identifier of the first forwarding device, where the identifier of the first forwarding device may be but is not limited to information that can uniquely identify the first forwarding device, such as a number, a name, an Internet Protocol (Internet Protocol, IP) address, or a Media Access Control (Media Access Control, MAC) address of the first forwarding device.

Optionally, when the controller further needs to monitor a link with a port of a third forwarding device as a start point, the controller may send a route update packet n to the third forwarding device by using a step similar to S201, where the route update packet n includes a route n and a first attribute indication message about the route n, and a prefix of the route n is an identifier of the third forwarding device.

S202. The first forwarding device sends a third route update packet to at least one target forwarding device based on the first attribute indication message. A link exists between each of the at least one target forwarding device and the first forwarding device, the third route update packet includes a third route and a second attribute indication message about the third route, a prefix of the third route is the identifier of the first forwarding device, and the second attribute indication message is used to instruct the forwarding device receiving the third route update packet not to advertise the third route to another forwarding device any longer.

Correspondingly, a second forwarding device receives the third route update packet sent by the first forwarding device and including the second attribute indication message. The second forwarding device is one of the at least one target forwarding device.

Because the first attribute indication message indicates one transmission hop of the first route, after receiving the first route update packet, the first forwarding device generates the second attribute indication message based on the first attribute indication message, generates the third route update packet carrying the second attribute indication message and the third route, and finally sends the third route update packet to the at least one target forwarding device based on the indication of the first attribute indication message.

The third route may be the same as the first route, or is generated by modifying other information in the first route than the prefix. This is not limited in this application.

As can be learned from the descriptions about the autonomous system and the link in the preamble, optionally, in a scenario in which a forwarding device is deployed in a form of an autonomous system in the communications network, the first forwarding device belongs to a first autonomous system, each of the at least one target forwarding device belongs to a second autonomous system, the second autonomous system is different from the first autonomous system, and any two of the at least one target forwarding device belong to different second autonomous systems.

Because the second forwarding device is one of the at least one target forwarding device, as can be learned from the foregoing descriptions, the first forwarding device belongs to the first autonomous system, the second forwarding device belongs to the second autonomous system, and the first autonomous system is different from the second autonomous system.

S203. The second forwarding device determines a target link, and monitors a state of the target link, where the target link is a link from the first forwarding device to the second forwarding device.

The second forwarding device has a link state monitoring function. Optionally, after determining the target link, the second forwarding device may enable the link state monitoring function, and then start to monitor the state of the target link. Optionally, the second forwarding device may enable the link state monitoring function based on a monitoring instruction sent by the controller to the second forwarding device.

Optionally, the monitoring instruction may be carried in a route update packet. This is not limited in this embodiment of this application. Certainly, the controller may also add a monitoring instruction to the first route update packet to enable a link state monitoring function of the first forwarding device. In this way, the controller may not only start, by using the first route update packet, the procedure for determining the state of the target link, but also instruct the first forwarding device to enable the link state monitoring function. This reduces information overheads, and improves utilization of transmission resources.

Figure 3:
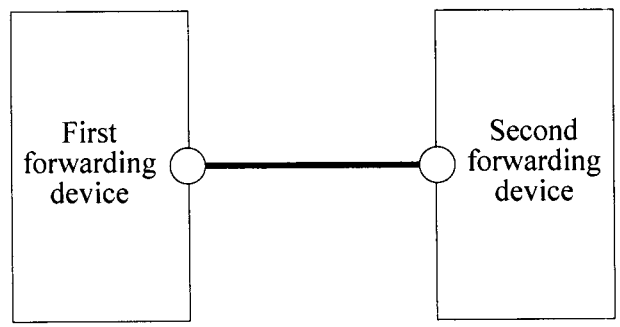
FIG. 3 is a schematic diagram of a target link according to an embodiment of this application.
Figure 4:
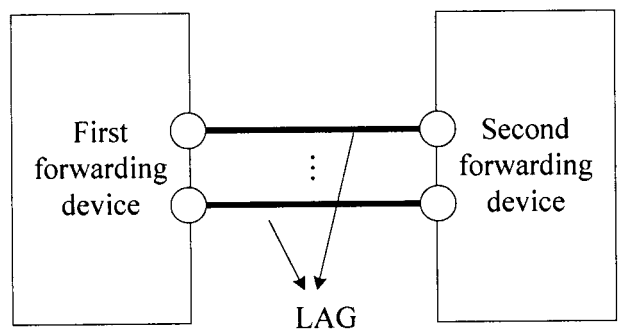
FIG. 4 is a schematic diagram of another target link according to an embodiment of this application.

Optionally, the link from the first forwarding device to the second forwarding device may be a single link in a conventional sense. As shown in FIG. 3, the start point of the link is a port of the first forwarding device, and an endpoint is a port of the second forwarding device; or the link from the first forwarding device to the second forwarding device may be a link aggregation group (LAG), as shown in FIG. 4, where the link aggregation group includes a plurality of member links, a start point of each member link is a port of the first forwarding device, and an endpoint is a port of the second forwarding device.

Optionally, when the link from the first forwarding device to the second forwarding device is the link shown in FIG. 3, the second forwarding device may determine the target link by performing the following steps.

The second forwarding device determines a port for receiving the third route update packet; and the second forwarding device determines the target link with the port as an endpoint.

In the foregoing method, the second forwarding device can accurately determine the target link.

Optionally, when the link from the first forwarding device to the second forwarding device is the link shown in FIG. 4, the second forwarding device may determine the target link by performing the following steps.

The second forwarding device determines a port for receiving the third route update packet; and the second forwarding device determines that a link with the port as an endpoint is a member link in a link aggregation group, and determines that the target link is the link aggregation group, where the link aggregation group includes a plurality of member links.

In the foregoing method, the second forwarding device can accurately determine the target link.

Optionally, when the target link is the link shown in FIG. 4, the second forwarding device may monitor the state of the target link by monitoring a state of each member link in the link aggregation group, and this specifically includes the following steps.

When determining that a state of at least one member link in the link aggregation group is normal, the second forwarding device detects that the state of the target link is normal; or when determining that states of all member links in the link aggregation group are faulty, the second forwarding device detects that the state of the target link is faulty.

Because the link aggregation group includes a plurality of member links, when a state of at least one member link in the plurality of member links is normal, the first forwarding device can successfully communicate with the second forwarding device. Therefore, when a state of at least one member link in the link aggregation group is normal, the state of the link aggregation group is normal.

In the foregoing method, the second forwarding device can accurately determine the state of the target link.

Optionally, the second forwarding device may use a plurality of conventional methods to monitor the target link shown in FIG. 3 or each member link in the link aggregation group shown in FIG. 4. For example, the second forwarding device may monitor a signal (an electrical signal or an optical signal) on the target link shown in FIG. 3 or the member link shown in FIG. 4; or the second forwarding device may monitor an interrupt message for the target link shown in FIG. 3 or the member link shown in FIG. 4.

For example, when detecting that a signal exists on the member link, the second forwarding device determines that the member link is normal; or when detecting that no signal exists on the member link, the second forwarding device determines that the member link is faulty.

For another example, when detecting an interrupt message for the member link, the second forwarding device determines that the member link is faulty; or when detecting no interrupt message for the member link, the second forwarding device determines that the member link is normal. The interrupt message for the member link is generated when the member link is faulty.

The second forwarding device generally uses a fixed collection period when using a conventional monitoring method (for example, monitoring a signal) to monitor a state of a link (e.g., a member link or a common link shown in FIG. 3). Therefore, when the state of the link changes, the second forwarding device can determine, only after a latency of up to one collection period, that the state of the link changes.

Because the interrupt message is generated in real time when the link (the member link or the common link shown in FIG. 3) is faulty, the second forwarding device monitors the state of the link by monitoring the interrupt message, and can determine the state of the link in real time. Therefore, a fault reporting time is only a time of transmitting a second route update packet, and is usually within 50 milliseconds (ms). When monitoring the state of the link by monitoring the interrupt message, in comparison with monitoring the state of the link by monitoring a signal, the second forwarding device can detect a link state change more quickly, thereby reducing the fault reporting time.

S204. The second forwarding device sends a second route update packet to the controller based on the monitored state of the target link, where the second route update packet includes a second route and a target field used to notify the controller of the state of the target link, and a prefix of the second route is the identifier of the first forwarding device.

Correspondingly, the controller receives the second route update packet sent by the second forwarding device, where the prefix of the second route included in the second route update packet is the identifier of the first forwarding device.

Optionally, after starting to monitor the state of the target link, the second forwarding device may continuously monitor the state of the target link and continuously perform S204. In this way, the second forwarding device may continuously monitor the state of the link when triggered by the third route update packet, and notify the controller of the state of the target link by sending the second route update packet.

Optionally, the second forwarding device sends the second route update packet to the controller based on the second attribute indication message in the third route update packet.

The second route may be the same as the third route, or is generated by modifying other information in the third route than the prefix. This is not limited in this application.

The target field may indicate the state of the target link in a plurality of implementations, for example, in the following possible implementations.

In a first possible implementation, the target field includes type information indicating a type of the second route update packet.

Optionally, in the first possible implementation, the second forwarding device may perform S204 by using the following two methods.

In a first method, when determining that the state of the target link is normal, the second forwarding device sends the second route update packet to the controller, where the type information included in the target field indicates that the type of the second route update packet is a route addition type; or when determining that the state of the target link is faulty, the second forwarding device sends the second route update packet to the controller, where the type information included in the target field indicates that the type of the second route update packet is a route deletion type.

In a second method, when determining that the state of the target link changes from faulty to normal, the second forwarding device sends the second route update packet to the controller, where the type information included in the target field indicates that the type of the second route update packet is a route addition type; or when determining that the state of the target link changes from normal to faulty, the second forwarding device sends the second route update packet to the controller, where the type information included in the target field indicates that the type of the second route update packet is a route deletion type.

In the two methods, the second route update packet of the route addition type is used to instruct the controller to add the second route, and the second route update packet of the route deletion type is used to instruct the controller to delete the second route.

In the foregoing method, the second forwarding device may notify the controller of the state of the target link by using the type of the second route update packet.

After determining the target link in S203, the second forwarding device may subsequently monitor the state of the target link all the time. Therefore, when the second forwarding device performs S204 by using the first method, the second forwarding device needs to send the second route update packet for a plurality of times, and the second forwarding device transmits the second route update packet to the controller at a relatively high frequency. In addition, when the state of the target link does not change for a long time, the controller does not need to receive the second route update packet for a plurality of times to determine the state of the target link.

Therefore, optionally, when the second forwarding device performs S204 by using the first method, a relatively long monitoring period (such as 1 s or 2 s) for monitoring the state of the target link may be set, and the second route update packet is sent to the controller based on the state of the target link monitored in each monitoring period.

When the second forwarding device performs S204 by using the second method, the second forwarding device sends the second route update packet only when the state of the target link changes. This can greatly reduce the frequency of transmitting the second route update packet by the second forwarding device to the controller.

In a second possible implementation, the target field includes a state identifier indicating the state of the target link.

Because no field indicating a state of a link exists in a current route update packet, the target field may be an extended field in the second route update packet.

Optionally, in the second possible implementation, similar to the first possible implementation, the second forwarding device may also perform S204 by using the following two methods.

In a first method, when determining that the state of the target link is normal, the second forwarding device sends the second route update packet to the controller, where the state identifier included in the target field is a normal state identifier; or when determining that the state of the target link is faulty, the second forwarding device sends the second route update packet to the controller, where the state identifier included in the target field is a faulty state identifier.

In a second method, when determining that the state of the target link changes from faulty to normal, the second forwarding device sends the second route update packet to the controller, where the state identifier included in the target field is a normal state identifier; or when determining that the state of the target link changes from normal to faulty, the second forwarding device sends the second route update packet to the controller, where the state identifier included in the target field is a faulty state identifier.

In the foregoing method, the second forwarding device may notify the controller of the state of the target link by using the state identifier in the second route update packet.

In the second possible implementation, same as the first possible implementation, when the second forwarding device performs S204 by using the first method, to avoid a problem that the second forwarding device transmits the second route update packet to the controller at a relatively high frequency, a relatively long monitoring period may be set for the second forwarding device for monitoring the state of the target link; or when the second forwarding device performs S204 by using the second method, the frequency of transmitting the second route update packet by the second forwarding device to the controller can also be greatly reduced.

In a third possible implementation, the target field includes a bandwidth of the target link.

Because no field including a bandwidth of a link exists in a current route update packet, the target field may be an extended field in the second route update packet.

Optionally, in the third possible implementation, the second forwarding device may perform S204 by using the following several methods.

In a first method, when determining that the state of the target link is normal, the second forwarding device determines the bandwidth of the target link, and sends the second route update packet to the controller, where the bandwidth of the target link included in the target field is greater than 0; or when determining that the state of the target link is faulty, the second forwarding device sends the second route update packet not including the target field to the controller.

In a second method, when determining that the state of the target link is normal, the second forwarding device determines the bandwidth of the target link, and sends the second route update packet to the controller, where the bandwidth of the target link included in the target field is greater than 0; or when determining that the state of the target link is faulty, the second forwarding device sends the second route update packet to the controller, where the bandwidth of the target link included in the target field is equal to 0.

In the foregoing method, the second forwarding device may notify the controller of the state of the target link by using the bandwidth of the link in the second route update packet.

Optionally, in the third possible implementation, when the target link is the link aggregation group, that the second forwarding device determines the bandwidth of the target link includes: the second forwarding device determines member links whose states are normal in the plurality of member links; and the second forwarding device determines that the bandwidth of the target link is equal to a sum of bandwidths of the member links whose states are normal.

In a fourth possible implementation, the target field includes a bandwidth of the target link.

Because no field including a bandwidth of a link exists in a current route update packet, the target field may be an extended field in the second route update packet.

Optionally, in the fourth possible implementation, when the target link is the link aggregation group, the second forwarding device may perform S204 by using the following method.

When determining that the state of the target link is normal, and that a member link whose state is normal in the target link changes, the second forwarding device determines the bandwidth of the target link; and the second forwarding device sends the second route update packet to the controller.

In the foregoing method, the second forwarding device may notify the controller of the state of the target link by using the bandwidth of the link in the second route update packet. In addition, when a member link whose state is normal in the target link changes, the second forwarding device may further notify the controller of a changed bandwidth of the target link by using the second route update packet.

Optionally, the fourth possible implementation may be used in combination with the first or the second possible implementation. To be specific, when the second forwarding device determines that the states of all the member links in the link aggregation group are normal, or that the states of all the member links in the link aggregation group change from faulty to normal, the second forwarding device performs the corresponding method in the first or the second possible implementation to notify the controller that the state of the target link is normal; when the second forwarding device determines that the states of all the member links in the link aggregation group are faulty, or that the states of all the member links in the link aggregation group change from normal to faulty, the second forwarding device performs the corresponding method in the first or the second possible implementation to notify the controller that the state of the target link is faulty; or when the second forwarding device determines that the state of the target link is normal, and that a member link whose state is normal in the target link changes, the second forwarding device notifies, by using the foregoing method and the bandwidth of the target link in the second route update packet, the controller that the state of the target link is normal.

Optionally, in the fourth possible implementation, that the second forwarding device determines the bandwidth of the target link includes: the second forwarding device determines member links whose states are normal in the plurality of member links; and the second forwarding device determines that the bandwidth of the target link is equal to a sum of bandwidths of the member links whose states are normal.

Optionally, in the fourth possible implementation, when the second forwarding device determines that the state of the target link is normal, and that a member link whose state is normal in the target link does not change, the second forwarding device sends a second route update packet not including the bandwidth of the target link to the controller, to notify that the target link is normal, and that the member link whose state is normal does not change.

S205. The controller determines the target link based on the identifier of the first forwarding device and a source address of the second route update packet, where the target link is the link from the first forwarding device to the second forwarding device.

Optionally, the source address is an Internet Protocol IP address.

As can be learned from the descriptions about the route update packet in the preamble, the route update packet may be encapsulated in an IP packet for transmission in the communications network. Therefore, the controller may determine, in an IP packet in which the second route update packet is encapsulated, the source address of the second route update packet (IP address of the second forwarding device).

In the descriptions about S201, the controller identifies, based on prefixes of routes carried in route update packets, which route update packets are used to determine the state of the link with the first forwarding device as the start point. Therefore, in this embodiment of this application, in S202 and S204, neither the first forwarding device nor the second forwarding device changes the prefix of the route. To be specific, both the prefix of the third route included in the third route update packet and the prefix of the second route included in the second route update packet are the prefix of the first route (the identifier of the first forwarding device). In this way, after receiving the second route update packet, the controller may determine that the second route update packet is used to determine the state of the link with the first forwarding device as the start point.

The controller may determine, based on the source address of the second route update packet, the endpoint of the link in the state indicated by the target field in the second route update packet.

In conclusion, the controller may determine the start point of the link based on the prefix of the second route in the second route update packet, determine the endpoint of the link based on the source address of the second route update packet, and determine the link (the target link) based on the start point of the link and the endpoint of the link.

S206. The controller determines the state of the target link based on the target field in the second route update packet, where the target field is used to notify the controller of the state of the target link.

As can be learned from the descriptions about S204, the target field may indicate the state of the target link in a plurality of implementations, including at least the first to the fourth possible implementations above. In different implementations, steps performed by the controller in S206 are different.

In the first possible implementation, the controller may perform S206 by performing the following step.

When determining that the type of the second route update packet indicated by the type information is the route addition type, the controller determines that the state of the target link is normal; or when determining that the type of the second route update packet indicated by the type information is the route deletion type, the controller determines that the state of the target link is faulty, where the second route update packet of the route addition type is used to instruct the controller to add the second route, and the second route update packet of the route deletion type is used to instruct the controller to delete the second route.

In the foregoing method, the controller may determine the state of the target link based on the type of the second route update packet.

In the second possible implementation, the controller may perform S206 by performing the following step. When determining that the state identifier is the normal state identifier, the controller determines that the state of the target link is normal; or when determining that the state identifier is the faulty state identifier, the controller determines that the state of the target link is faulty.

In the foregoing method, the controller may determine the state of the target link based on the state identifier in the second route update packet.

In the third possible implementation, the controller may perform S206 by performing the following steps.

The controller obtains the bandwidth of the target link included in the target field; and when determining that the bandwidth of the target link is greater than 0, the controller determines that the state of the target link is normal; or when determining that the bandwidth of the target link is equal to 0, the controller determines that the state of the target link is faulty; or if the controller determines that the second route update packet not including the target field is received in S206, the controller may determine that the state of the target link is faulty.

In the foregoing method, the controller may determine the state of the target link based on the bandwidth of the target link in the second route update packet.

In the fourth possible implementation, the controller may perform S206 by performing the following step.

When determining that the target field exists in the second route update packet, the controller determines that the state of the target link is normal.

Certainly, if the controller determines that the second route update packet not including the target field is received in S206, the controller may determine that the state of the target link is normal, and that the member link whose state is normal in the target link does not change.

In the foregoing method, the controller may determine the state of the target link based on the bandwidth of the target link in the second route update packet.

Optionally, in the fourth possible implementation, the method further includes: the controller determines that the bandwidth of the target link is the bandwidth of the target link included in the target field.

By performing the foregoing S201 to S206, the controller may determine the state of the target link. Optionally, the controller may perform the foregoing procedure for each forwarding device in the communications network, to monitor states of all links in the communications network. Therefore, efficiency of monitoring the states of the links by the controller can be improved.

Optionally, when the communications network uses a route advertisement mechanism based on the Border Gateway Protocol (BGP), a logical connection between the controller and the forwarding device (including the first forwarding device and the second forwarding device) is an IBGP connection. The link (physical connection) between the first forwarding device and the second forwarding device is an EBGP connection.

Therefore, when performing S201: the controller sends the first route update packet to the first forwarding device by using IBGP; and the first forwarding device receives, by using IBGP, the first route update packet sent by the controller.

When performing S202: the first forwarding device sends the third route update packet to the at least one target forwarding device by using EBGP; and the second forwarding device receives, by using EBGP, the third route update packet sent by the first forwarding device.

When performing S204: the second forwarding device sends the second route update packet to the controller by using IBGP; and the controller receives, by using IBGP, the second route update packet sent by the second forwarding device.

In the foregoing method, transmission of route update packets can be implemented between the controller, the first forwarding device, and the second forwarding device.

According to the method provided by this embodiment of this application, the controller may use the conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor the states of all the links in the communications network by sending one first route update packet to each forwarding device in the communications network. Therefore, the method can greatly reduce a frequency of sending route update packets by the controller, and can further reduce a load of the controller.

In a conventional link monitoring method, a controller generally sends a route update packet for a link by using a specified packet sending period (e.g., generally 333 ms). In this case, when the controller determines that no route update packet is received before expiry of three consecutive timers that are set for the route update packet, the controller determines that a state of the link is faulty. Therefore, when the conventional link monitoring method is used, a time from occurrence of a link fault to determining, by the controller, that the state of the link is faulty, is three packet sending periods, and is generally about is (e.g., 333 ms*3). However, in the method provided by this embodiment of this application, the second forwarding device may determine the state of the link in real time or after a latency of one collection period, and notify the controller by using the second route update packet. Therefore, in the method provided by this embodiment of this application, a link fault reporting time is approximately a transmission time of the second route update packet, and is generally 50 ms. Obviously, in comparison with the conventional link monitoring method, the fault reporting time in the method provided by this embodiment of this application is shorter. In this way, the controller can determine the faulty link more quickly, and therefore perform fast troubleshooting to reduce a fault recovery time.

In addition, because the controller sends route update packets excessively frequently in the conventional link monitoring method, a scale of the communications network is limited. For example, in a communications network in which a single controller controls virtual routers, the controller may support about 1 K links, and support 512 servers in a non-blocking network. In comparison with the conventional link monitoring method, if the controller uses the method provided by this embodiment of this application, the controller can greatly reduce the frequency of sending route update packets, and this resolves a problem of a limited processing capability of the controller. Therefore, the method provided by this embodiment of this application does not limit the scale of the communications network. For example, the single controller may support a larger quantity of links (e.g., at least 200 K), and support at least 100 K servers.

Figure 5:
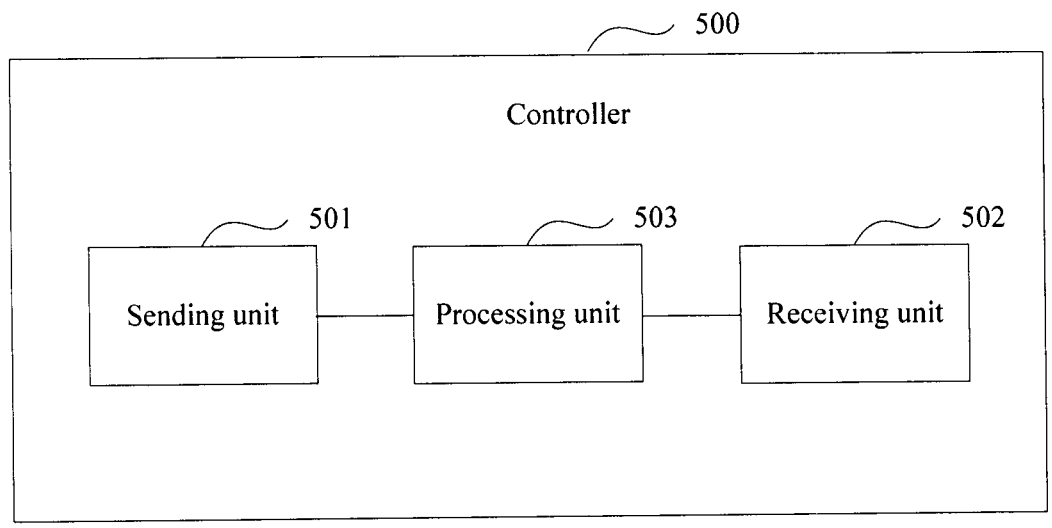
FIG. 5 is a structural diagram of a controller according to an embodiment of this application.

Based on the foregoing embodiment, this application further provides a controller. The controller is configured to implement the method shown in FIG. 2, and the controller is applied to the communications network shown in FIG. 1. Referring to FIG. 5, the controller 500 includes a sending unit 501, a receiving unit 502, and a processing unit 503.

The sending unit 501 is configured to send a first route update packet to a first forwarding device, where the first route update packet includes a first route and a first attribute indication message about the first route, a prefix of the first route is an identifier of the first forwarding device, and the first attribute indication message is used to indicate one transmission hop of the first route.

The receiving unit 502 is configured to receive a second route update packet sent by a second forwarding device, where a prefix of a second route included in the second route update packet is the identifier of the first forwarding device.

The processing unit 503 is configured to: determine a target link based on the identifier of the first forwarding device and a source address of the second route update packet, where the target link is a link from the first forwarding device to the second forwarding device; and determine a state of the target link based on a target field in the second route update packet, where the target field is used to notify the controller 500 of the state of the target link.

Optionally, the source address is an Internet Protocol IP address.

Optionally, the target field includes type information indicating a type of the second route update packet; and when determining the state of the target link based on the target field, the processing unit 503 is specifically configured to: when determining that the type of the second route update packet indicated by the type information is a route addition type, determine that the state of the target link is normal; or when determining that the type of the second route update packet indicated by the type information is a route deletion type, determine that the state of the target link is faulty, where the second route update packet of the route addition type is used to instruct the controller 500 to add the second route, and the second route update packet of the route deletion type is used to instruct the controller 500 to delete the second route.

Optionally, the target field includes a state identifier indicating the state of the target link; and when determining the state of the target link based on the target field, the processing unit 503 is specifically configured to: when determining that the state identifier is a normal state identifier, determine that the state of the target link is normal; or when determining that the state identifier is a faulty state identifier, determine that the state of the target link is faulty.

Optionally, the target field includes a bandwidth of the target link; and when determining the state of the target link based on the target field, the processing unit 503 is specifically configured to: when determining that the target field exists in the second route update packet, determine that the state of the target link is normal.

Optionally, the processing unit 503 is further configured to: determine that the bandwidth of the target link is the bandwidth of the target link included in the target field.

Optionally, the target field includes a bandwidth of the target link; and when determining the state of the target link based on the target field, the processing unit 503 is specifically configured to: obtain the bandwidth of the target link included in the target field; and when determining that the bandwidth of the target link is greater than 0, determine that the state of the target link is normal; or when determining that the bandwidth of the target link is equal to 0, determine that the state of the target link is faulty.

Optionally, when sending the first route update packet to the first forwarding device, the sending unit 501 is specifically configured to: send the first route update packet to the first forwarding device by using the Internal Border Gateway Protocol IBGP; and when receiving the second route update packet sent by the second forwarding device, the receiving unit 502 is specifically configured to: receive, by using the IBGP, the second route update packet sent by the second forwarding device.

This embodiment of this application provides a controller. The controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

Figure 6:
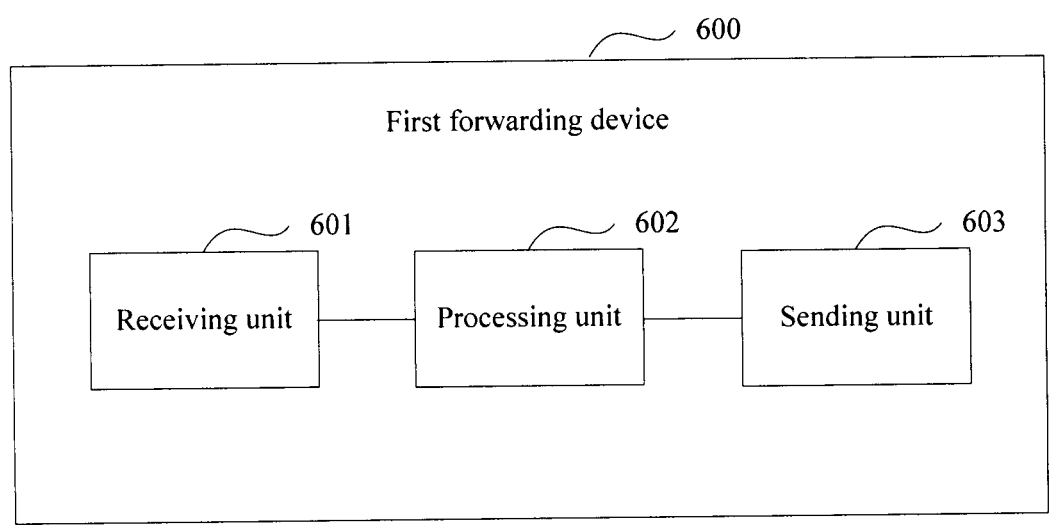
FIG. 6 is a structural diagram of a first forwarding device according to an embodiment of this application.

Based on the foregoing embodiment, this application further provides a first forwarding device. The first forwarding device is configured to implement the method shown in FIG. 2, and the first forwarding device is applied to the communications network shown in FIG. 1. Referring to FIG. 6, the first forwarding device 600 includes a receiving unit 601, a processing unit 602, and a sending unit 603.

The receiving unit 601 is configured to receive a first route update packet sent by a controller, where the first route update packet includes a first route and a first attribute indication message about the first route, a prefix of the first route is an identifier of the first forwarding device 600, and the first attribute indication message is used to indicate one transmission hop of the first route.

The processing unit 602 is configured to send, by using the sending unit 603, a third route update packet to at least one target forwarding device based on the first attribute indication message, where a link exists between each of the at least one target forwarding device and the first forwarding device 600, the third route update packet includes a third route and a second attribute indication message about the third route, a prefix of the third route is the identifier of the first forwarding device 600, and the second attribute indication message is used to instruct the forwarding device receiving the third route update packet not to advertise the third route to another forwarding device any longer.

The sending unit 603 is configured to send the third route update packet to the at least one target forwarding device.

Optionally, the first forwarding device 600 belongs to a first autonomous system, each of the at least one target forwarding device belongs to a second autonomous system, the second autonomous system is different from the first autonomous system, and any two of the at least one target forwarding device belong to different second autonomous systems.

Optionally, when receiving the first route update packet sent by the controller, the receiving unit 601 is specifically configured to: receive, by using the Internal Border Gateway Protocol (IBGP), the first route update packet sent by the controller; and when sending the third route update packet to the at least one target forwarding device, the sending unit 603 is specifically configured to: send the third route update packet to the at least one target forwarding device by using the External Border Gateway Protocol (EBGP).

This embodiment of this application provides a first forwarding device. After receiving the first route update packet sent by the controller, the first forwarding device may send the third route update packet to the at least one target forwarding device that has a link to the first forwarding device, to trigger the at least one target forwarding device to start to monitor a state of a target link (from the first forwarding device to the at least one target forwarding device), so that a second forwarding device can notify the controller of the monitored state of the target link by using a second route update packet.

Figure 7:
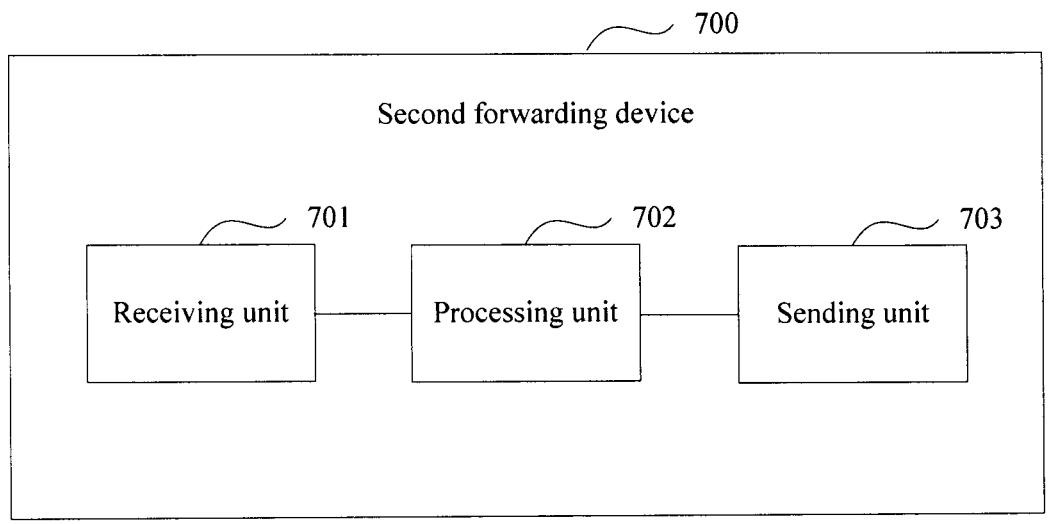
FIG. 7 is a structural diagram of a second forwarding device according to an embodiment of this application.

Based on the foregoing embodiment, this application further provides a second forwarding device. The second forwarding device is configured to implement the method shown in FIG. 2, and the second forwarding device is applied to the communications network shown in FIG. 1. Referring to FIG. 7, the second forwarding device 700 includes a receiving unit 701, a processing unit 702, and a sending unit 703.

The receiving unit 701 is configured to receive a third route update packet sent by a first forwarding device and including a second attribute indication message, where the third route update packet further includes a third route, a prefix of the third route is an identifier of the first forwarding device, and the second attribute indication message is used to instruct the forwarding device receiving the third route update packet not to advertise the third route to another forwarding device any longer.

The processing unit 702 is configured to: determine a target link, and monitor a state of the target link, where the target link is a link from the first forwarding device to the second forwarding device 700; and send, by using the sending unit 703, a second route update packet to a controller based on the monitored state of the target link, where the second route update packet includes a second route and a target field used to notify the controller of the state of the target link, and a prefix of the second route is the identifier of the first forwarding device.

The sending unit 703 is configured to send the second route update packet to the controller.

Optionally, when determining the target link, the processing unit 702 is specifically configured to: determine a port for receiving the third route update packet; and determine the target link with the port as an endpoint; or determine that a link with the port as an endpoint is a member link in a link aggregation group, and determine that the target link is the link aggregation group, where the link aggregation group includes a plurality of member links.

Optionally, when the target link is the link aggregation group, when monitoring the state of the target link, the processing unit 702 is specifically configured to: when determining that a state of at least one member link in the link aggregation group is normal, detect that the state of the target link is normal; or when determining that states of all member links in the link aggregation group are faulty, detect that the state of the target link is faulty.

Optionally, the target field includes type information indicating a type of the second route update packet; and when sending, by using the sending unit 703, the second route update packet to the controller based on the state of the target link, the processing unit 702 is specifically configured to: when determining that the state of the target link is normal, send the second route update packet to the controller by using the sending unit 703, where the type information included in the target field indicates that the type of the second route update packet is a route addition type, or when determining that the state of the target link is faulty, send the second route update packet to the controller by using the sending unit 703, where the type information included in the target field indicates that the type of the second route update packet is a route deletion type; or when determining that the state of the target link changes from faulty to normal, send the second route update packet to the controller by using the sending unit 703, where the type information included in the target field indicates that the type of the second route update packet is a route addition type, or when determining that the state of the target link changes from normal to faulty, send the second route update packet to the controller by using the sending unit 703, where the type information included in the target field indicates that the type of the second route update packet is a route deletion type, where the second route update packet of the route addition type is used to instruct the controller to add the second route, and the second route update packet of the route deletion type is used to instruct the controller to delete the second route.

Optionally, the target field includes a state identifier indicating the state of the target link; and when sending, by using the sending unit 703, the second route update packet to the controller based on the state of the target link, the processing unit 702 is specifically configured to: when determining that the state of the target link is normal, send the second route update packet to the controller by using the sending unit 703, where the state identifier included in the target field is a normal state identifier, or when determining that the state of the target link is faulty, send the second route update packet to the controller by using the sending unit 703, where the state identifier included in the target field is a faulty state identifier; or when determining that the state of the target link changes from faulty to normal, send the second route update packet to the controller by using the sending unit 703, where the state identifier included in the target field is a normal state identifier, or when determining that the state of the target link changes from normal to faulty, send the second route update packet to the controller by using the sending unit 703, where the state identifier included in the target field is a faulty state identifier.

Optionally, the target field includes a bandwidth of the target link; and when sending, by using the sending unit 703, the second route update packet to the controller based on the state of the target link, the processing unit 702 is specifically configured to: when determining that the state of the target link is normal, determine the bandwidth of the target link, and send the second route update packet to the controller by using the sending unit 703, where the bandwidth of the target link included in the target field is greater than 0; or when determining that the state of the target link is faulty, send the second route update packet to the controller by using the sending unit 703, where the bandwidth of the target link included in the target field is equal to 0.

Optionally, when the target link is the link aggregation group, when determining the bandwidth of the target link, the processing unit 702 is specifically configured to: determine member links whose states are normal in the plurality of member links; and determine that the bandwidth of the target link is equal to a sum of bandwidths of the member links whose states are normal.

Optionally, the target field includes a bandwidth of the target link; and when the target link is the link aggregation group, when sending, by using the sending unit 703, the second route update packet to the controller based on the state of the target link, the processing unit 702 is specifically configured to: when determining that the state of the target link is normal, and that a member link whose state is normal in the target link changes, determine the bandwidth of the target link; and send the second route update packet to the controller by using the sending unit 703.

Optionally, when determining the bandwidth of the target link, the processing unit 702 is specifically configured to: determine member links whose states are normal in the plurality of member links; and determine that the bandwidth of the target link is equal to a sum of bandwidths of the member links whose states are normal.

Optionally, the first forwarding device belongs to a first autonomous system, the second forwarding device 700 belongs to a second autonomous system, and the first autonomous system is different from the second autonomous system.

Optionally, when receiving the third route update packet sent by the first forwarding device, the receiving unit 701 is specifically configured to: receive, by using the External Border Gateway Protocol (EBGP), the third route update packet sent by the first forwarding device; and when sending the second route update packet to the controller, the sending unit 703 is specifically configured to: send the second route update packet to the controller by using the Internal Border Gateway Protocol IBGP.

This embodiment of this application provides a second forwarding device. The second forwarding device starts to monitor the state of the target link when triggered by the received third route update packet sent by the first forwarding device. In this way, the second forwarding device notifies the controller of the monitored state of the target link by using the second route update packet.

It should be noted that, in the embodiments of this application, division of units is an example and is merely logical function division and may be other division in an actual implementation. In addition, functional units in each embodiment of this application may be integrated into one processing unit, or each functional unit may exist independently, or two or more of the units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current system, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Based on the foregoing embodiment, an embodiment of this application further provides a computer storage medium, where the storage medium stores a software program, and when the software program is read and executed by one or more processors, the method for determining a link state according to the foregoing embodiment may be implemented. The computer storage medium may include any medium that can store program code, such as a USB flash drive, a removable hard disk, a read-only memory (ROM), a random access memory (RAM), a magnetic disk, or an optical disc.

Based on the foregoing embodiment, an embodiment of this application further provides a computer program product including an instruction, and when the computer program product runs on a computer, the computer performs the method for determining a link state according to the foregoing embodiment.

Figure 8:
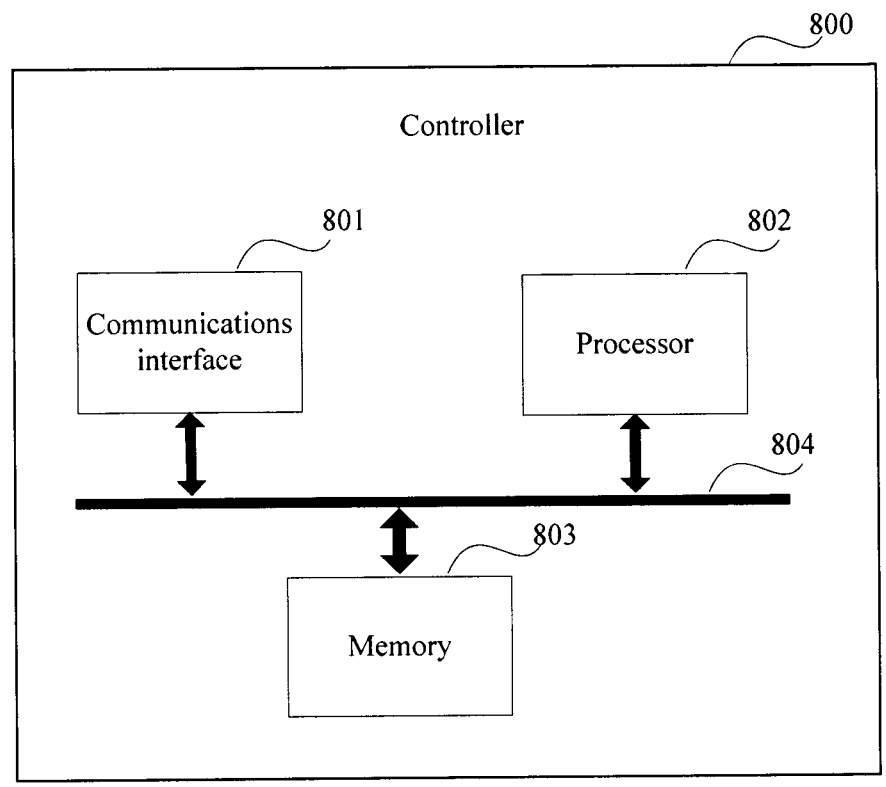
FIG. 8 is a structural diagram of another controller according to an embodiment of this application.

Based on the foregoing embodiment, an embodiment of this application further provides a controller. The controller is applied to the communications network shown in FIG. 1, and is configured to implement the method for determining a link state as shown in FIG. 2, and has functions of the controller 500 shown in FIG. 5. Referring to FIG. 8, the controller 800 includes a communications interface 801, a processor 802, and a memory 803. The communications interface 801, the processor 802, and the memory 803 are interconnected.

Optionally, the communications interface 801, the processor 802, and the memory 803 may be interconnected by using a bus 804. The bus 804 may be a peripheral component interconnect (PCI) standard bus, or an extended industry standard architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

The communications interface 801 is configured to receive and send data, and implement communication with another device (such as a forwarding device) in the communications network. Optionally, the communications interface includes a port.

The processor 802 is configured to implement the method for determining a link state as shown in FIG. 2, including: sending a first route update packet to a first forwarding device by using the communications interface 801, where the first route update packet includes a first route and a first attribute indication message about the first route, a prefix of the first route is an identifier of the first forwarding device, and the first attribute indication message is used to indicate one transmission hop of the first route; receiving, by using the communications interface 801, a second route update packet sent by a second forwarding device, where a prefix of a second route included in the second route update packet is the identifier of the first forwarding device; determining a target link based on the identifier of the first forwarding device and a source address of the second route update packet, where the target link is a link from the first forwarding device to the second forwarding device; and determining a state of the target link based on a target field in the second route update packet, where the target field is used to notify the controller 800 of the state of the target link.

Optionally, the source address is an Internet Protocol IP address.

Optionally, the target field includes type information indicating a type of the second route update packet; and when determining the state of the target link based on the target field, the processor 802 is specifically configured to: when determining that the type of the second route update packet indicated by the type information is a route addition type, determine that the state of the target link is normal; or when determining that the type of the second route update packet indicated by the type information is a route deletion type, determine that the state of the target link is faulty, where the second route update packet of the route addition type is used to instruct the controller 800 to add the second route, and the second route update packet of the route deletion type is used to instruct the controller 800 to delete the second route.

Optionally, the target field includes a state identifier indicating the state of the target link; and when determining the state of the target link based on the target field, the processor 802 is specifically configured to: when determining that the state identifier is a normal state identifier, determine that the state of the target link is normal; or when determining that the state identifier is a faulty state identifier, determine that the state of the target link is faulty.

Optionally, the target field includes a bandwidth of the target link; and when determining the state of the target link based on the target field, the processor 802 is specifically configured to: when determining that the target field exists in the second route update packet, determine that the state of the target link is normal.

Optionally, the processor 802 is further configured to: determine that the bandwidth of the target link is the bandwidth of the target link included in the target field.

Optionally, the target field includes a bandwidth of the target link; and when determining the state of the target link based on the target field, the processor 802 is specifically configured to: obtain the bandwidth of the target link included in the target field; and when determining that the bandwidth of the target link is greater than 0, determine that the state of the target link is normal; or when determining that the bandwidth of the target link is equal to 0, determine that the state of the target link is faulty.

Optionally, when sending the first route update packet to the first forwarding device by using the communications interface 801, the processor 802 is specifically configured to: send the first route update packet to the first forwarding device by using the communications interface 801 and the Internal Border Gateway Protocol IBGP; and when receiving, by using the communications interface 801, the second route update packet sent by the second forwarding device, the processor 802 is specifically configured to: receive, by using the communications interface 801 and the IBGP, the second route update packet sent by the second forwarding device.

The memory 803 is configured to store a program instruction, and the like. Specifically, the program instruction may include program code, and the program code includes a computer operation instruction. The memory 803 may include a random access memory (RAM), or may further include a non-volatile memory, for example, at least one disk storage. The processor 802 executes the program stored in the memory 803 and implements the foregoing functions to implement the method for determining a link state according to the foregoing embodiment.

This embodiment of this application provides a controller. The controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

Figure 9:
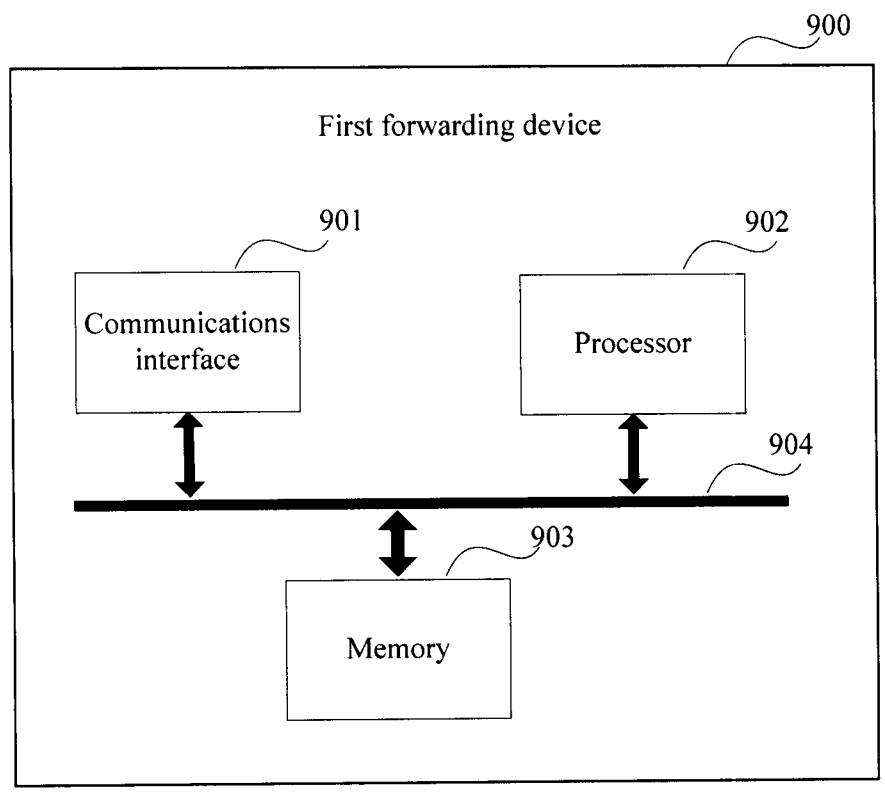
FIG. 9 is a structural diagram of another first forwarding device according to an embodiment of this application.

Based on the foregoing embodiment, an embodiment of this application further provides a first forwarding device. The first forwarding device is applied to the communications network shown in FIG. 1, and is configured to implement the method for determining a link state as shown in FIG. 2, and has functions of the first forwarding device 600 shown in FIG. 6. Referring to FIG. 9, the first forwarding device 900 includes a communications interface 901, a processor 902, and a memory 903. The communications interface 901, the processor 902, and the memory 903 are interconnected.

Optionally, the communications interface 901, the processor 902, and the memory 903 may be interconnected by a bus 904. The bus 904 may be a PCI bus or an EISA bus or the like. The bus 904 may be classified into an address bus, a data bus, a control bus, and the like. For ease of representation, only one thick line is used to represent the bus in FIG. 9, but this does not mean that there is only one bus or only one type of bus.

The communications interface 901 is configured to receive and send data, and implement communication with another device (such as another forwarding device or a controller) in the communications network. Optionally, the communications interface 901 includes a port.

The processor 902 is configured to implement the method for determining a link state as shown in FIG. 2, including: receiving, by using the communications interface 901, a first route update packet sent by a controller, where the first route update packet includes a first route and a first attribute indication message about the first route, a prefix of the first route is an identifier of the first forwarding device 900, and the first attribute indication message is used to indicate one transmission hop of the first route; and sending, by using the communications interface 901, a third route update packet to at least one target forwarding device based on the first attribute indication message, where a link exists between each of the at least one target forwarding device and the first forwarding device 900, the third route update packet includes a third route and a second attribute indication message about the third route, a prefix of the third route is the identifier of the first forwarding device 900, and the second attribute indication message is used to instruct the forwarding device receiving the third route update packet not to advertise the third route to another forwarding device any longer.

Optionally, the first forwarding device 900 belongs to a first autonomous system, each of the at least one target forwarding device belongs to a second autonomous system, the second autonomous system is different from the first autonomous system, and any two of the at least one target forwarding device belong to different second autonomous systems.

Optionally, when receiving, by using the communications interface 901, the first route update packet sent by the controller, the processor 902 is specifically configured to: receive, by using the communications interface 901 and the Internal Border Gateway Protocol IBGP, the first route update packet sent by the controller; and when sending the third route update packet to the at least one target forwarding device by using the communications interface 901, the processor 902 is specifically configured to: send the third route update packet to the at least one target forwarding device by using the communications interface 901 and the External Border Gateway Protocol EBGP.

The memory 903 is configured to store a program instruction, and the like. Specifically, the program instruction may include program code, and the program code includes a computer operation instruction. The memory 903 may include a RAM, or may further include a non-volatile memory, for example, at least one disk storage. The processor 902 executes the program stored in the memory 903 and implements the foregoing functions to implement the method for determining a link state according to the foregoing embodiment.

This embodiment of this application provides a first forwarding device. After receiving the first route update packet sent by the controller, the first forwarding device may send the third route update packet to the at least one target forwarding device that has a link to the first forwarding device, to trigger the at least one target forwarding device to start to monitor a state of a target link (from the first forwarding device to the at least one target forwarding device), so that a second forwarding device can notify the controller of the monitored state of the target link by using a second route update packet.

Figure 10:
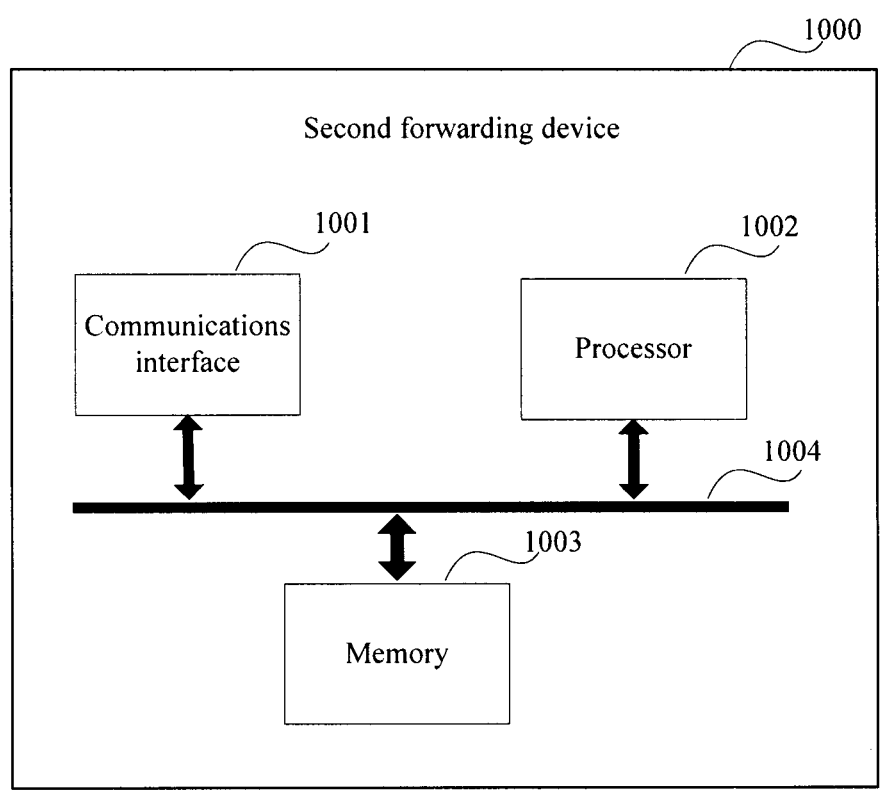
FIG. 10 is a structural diagram of another second forwarding device according to an embodiment of this application

Based on the foregoing embodiment, an embodiment of this application further provides a second forwarding device. The second forwarding device is applied to the communications network shown in FIG. 1, and is configured to implement the method for determining a link state as shown in FIG. 2, and has functions of the second forwarding device 700 shown in FIG. 7. Referring to FIG. 10, the second forwarding device 1000 includes a communications interface 1001, a processor 1002, and a memory 1003. The communications interface 1001, the processor 1002, and the memory 1003 are interconnected.

Optionally, the communications interface 1001, the processor 1002, and the memory 1003 may be interconnected by using a bus 1004. The bus 1004 may be a PCI bus or an EISA bus or the like. The bus 1004 may be classified into an address bus, a data bus, a control bus, and the like. For ease of representation, only one thick line is used to represent the bus in FIG. 10, but this does not mean that there is only one bus or only one type of bus.

The communications interface 1001 is configured to receive and send data, and implement communication with another device (such as a forwarding device or a second forwarding device) in the communications network. Optionally, the communications interface 1001 includes a port.

The processor 1002 is configured to implement the method for determining a link state as shown in FIG. 2, including: receiving, by using the communications interface 1001, a third route update packet sent by a first forwarding device and including a second attribute indication message, where the third route update packet further includes a third route, a prefix of the third route is an identifier of the first forwarding device, and the second attribute indication message is used to instruct the forwarding device receiving the third route update packet not to advertise the third route to another forwarding device any longer; determining a target link, and monitoring a state of the target link, where the target link is a link from the first forwarding device to the second forwarding device woo; and sending, by using the communications interface 1001, a second route update packet to a controller based on the monitored state of the target link, where the second route update packet includes a second route and a target field used to notify the controller of the state of the target link, and a prefix of the second route is the identifier of the first forwarding device.

Optionally, when determining the target link, the processor 1002 is specifically configured to: determine a port for receiving the third route update packet; and determine the target link with the port as an endpoint; or determine that a link with the port as an endpoint is a member link in a link aggregation group, and determine that the target link is the link aggregation group, where the link aggregation group includes a plurality of member links.

Optionally, when the target link is the link aggregation group, when monitoring the state of the target link, the processor 1002 is specifically configured to: when determining that a state of at least one member link in the link aggregation group is normal, detect that the state of the target link is normal; or when determining that states of all member links in the link aggregation group are faulty, detect that the state of the target link is faulty.

Optionally, the target field includes type information indicating a type of the second route update packet; and when sending, by using the communications interface 1001, the second route update packet to the controller based on the state of the target link, the processor 1002 includes: when determining that the state of the target link is normal, sending the second route update packet to the controller by using the communications interface 1001, where the type information included in the target field indicates that the type of the second route update packet is a route addition type, or when determining that the state of the target link is faulty, sending the second route update packet to the controller by using the communications interface 1001, where the type information included in the target field indicates that the type of the second route update packet is a route deletion type; or when determining that the state of the target link changes from faulty to normal, sending the second route update packet to the controller by using the communications interface 1001, where the type information included in the target field indicates that the type of the second route update packet is a route addition type, or when determining that the state of the target link changes from normal to faulty, sending the second route update packet to the controller by using the communications interface 1001, where the type information included in the target field indicates that the type of the second route update packet is a route deletion type, where the second route update packet of the route addition type is used to instruct the controller to add the second route, and the second route update packet of the route deletion type is used to instruct the controller to delete the second route.

Optionally, the target field includes a state identifier indicating the state of the target link; and when sending, by using the communications interface 1001, the second route update packet to the controller based on the state of the target link, the processor 1002 is specifically configured to: when determining that the state of the target link is normal, send the second route update packet to the controller by using the communications interface 1001, where the state identifier included in the target field is a normal state identifier, or when determining that the state of the target link is faulty, send the second route update packet to the controller by using the communications interface 1001, where the state identifier included in the target field is a faulty state identifier; or when determining that the state of the target link changes from faulty to normal, send the second route update packet to the controller by using the communications interface 1001, where the state identifier included in the target field is a normal state identifier, or when determining that the state of the target link changes from normal to faulty, send the second route update packet to the controller by using the communications interface 1001, where the state identifier included in the target field is a faulty state identifier.

Optionally, the target field includes a bandwidth of the target link; and when sending, by using the communications interface 1001, the second route update packet to the controller based on the state of the target link, the processor 1002 is specifically configured to: when determining that the state of the target link is normal, determine the bandwidth of the target link, and send the second route update packet to the controller by using the communications interface 1001, where the bandwidth of the target link included in the target field is greater than 0; or when determining that the state of the target link is faulty, send the second route update packet to the controller by using the communications interface 1001, where the bandwidth of the target link included in the target field is equal to 0.

Optionally, when the target link is the link aggregation group, when determining the bandwidth of the target link, the processor 1002 is specifically configured to: determine member links whose states are normal in the plurality of member links; and determine that the bandwidth of the target link is equal to a sum of bandwidths of the member links whose states are normal.

Optionally, the target field includes a bandwidth of the target link; and when the target link is the link aggregation group, when sending, by using the communications interface 1001, the second route update packet to the controller based on the state of the target link, the processor 1002 is specifically configured to: when determining that the state of the target link is normal, and that a member link whose state is normal in the target link changes, determine the bandwidth of the target link; and send the second route update packet to the controller by using the communications interface 1001.

Optionally, when determining the bandwidth of the target link, the processor 1002 is specifically configured to: determine member links whose states are normal in the plurality of member links; and determine that the bandwidth of the target link is equal to a sum of bandwidths of the member links whose states are normal.

Optionally, the first forwarding device belongs to a first autonomous system, the second forwarding device 1000 belongs to a second autonomous system, and the first autonomous system is different from the second autonomous system.

Optionally, when receiving, by using the communications interface 1001, the third route update packet sent by the first forwarding device, the processor 1002 is specifically configured to: receive, by using the communications interface 1001 and the External Border Gateway Protocol EBGP, the third route update packet sent by the first forwarding device; and when sending the second route update packet to the controller by using the communications interface 1001, the processor 1002 is specifically configured to: send the second route update packet to the controller by using the communications interface 1001 and the Internal Border Gateway Protocol IBGP.

The memory 1003 is configured to store a program instruction, and the like. Specifically, the program instruction may include program code, and the program code includes a computer operation instruction. The memory 1003 may include a random access memory (RAM), or may further include a non-volatile memory, for example, at least one disk storage. The processor 1002 executes the program stored in the memory 1003 and implements the foregoing functions to implement the method for determining a link state according to the foregoing embodiment.

This embodiment of this application provides a second forwarding device. The second forwarding device starts to monitor the state of the target link when triggered by the received third route update packet sent by the first forwarding device. In this way, the second forwarding device notifies the controller of the monitored state of the target link by using the second route update packet.

In conclusion, the embodiments of this application provide a method for determining a link state and a device. In the method, a controller in a communications network sends a first route update packet to a first forwarding device, where the first route update packet includes a first route whose prefix is an identifier of the first forwarding device, and a first attribute indication message indicating one transmission hop of the first route; the first forwarding device sends, based on the first attribute indication message in the received first route update packet, a third route update packet to at least one target forwarding device that has a link to the first forwarding device, where the third route update packet includes a third route whose prefix is the identifier of the first forwarding device, and a second attribute indication message instructing the forwarding device receiving the third route update packet not to advertise the third route to another forwarding device any longer; after receiving the third route update packet, the second forwarding device in the at least one target forwarding device determines a target link from the first forwarding device to the second forwarding device, monitors a state of the target link, and sends a second route update packet to the controller based on the monitored state of the target link, where the second route update packet includes a second route whose prefix is the identifier of the first forwarding device, and a target field notifying the controller of the state of the target link; and after receiving the second route update packet, the controller may determine the target link based on the identifier of the first forwarding device and a source address of the second route update packet, and determine the state of the target link based on the target field in the second route update packet. In the foregoing method, the controller may use a conventional route advertisement mechanism to determine a state of a link in the communications network and implement link monitoring, without configuring or adjusting a forwarding device in the communications network. Because the controller can determine the state of the target link only by sending the first route update packet to the first forwarding device, the controller can monitor states of all links in the communications network by sending one first route update packet to each forwarding device in the communications network. Therefore, the method can greatly reduce a frequency of sending route update packets by the controller, and can further reduce a load of the controller.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
receiving, by a second forwarding device from a first forwarding device, a third route update packet, wherein the third route update packet comprises a second attribute indication message and a third route, a prefix of the third route is an identifier of the first forwarding device, and the second attribute indication message instructs the second forwarding device not to advertise the third route to another forwarding device any longer;
determining, by the second forwarding device, a target link, wherein determining, by the second forwarding device, the target link comprises:
determining, by the second forwarding device, a port for receiving the third route update packet; and
performing at least one of:
determining, by the second forwarding device, the target link with the port as an endpoint; or
determining, by the second forwarding device, that a link with the port as an endpoint is a member link in a link aggregation group, and determining that the target link is the link aggregation group, wherein the link aggregation group comprises a plurality of member links;
monitoring, by the second forwarding device, a state of the target link, wherein the target link is a link from the first forwarding device to the second forwarding device; and
sending, by the second forwarding device, a second route update packet to a controller according to the state of the target link, wherein the second route update packet comprises a second route and a target field notifying the controller of the state of the target link, and a prefix of the second route is the identifier of the first forwarding device.

2. The method according to claim 1, wherein when the target link is the link aggregation group, monitoring, by the second forwarding device, the state of the target link comprises:
when determining that a state of a member link in the link aggregation group is normal, detecting, by the second forwarding device, that the state of the target link is normal; or
when determining that a respective state of all member links in the link aggregation group are faulty, detecting, by the second forwarding device, that the state of the target link is faulty.

3. The method according to claim 1, wherein:
the target field comprises type information indicating a type of the second route update packet; and
sending, by the second forwarding device, the second route update packet to the controller according to the state of the target link comprises:
when determining that the state of the target link is normal, sending, by the second forwarding device, the second route update packet to the controller, wherein the type information indicates that the type of the second route update packet is a route addition type;
when determining that the state of the target link is faulty, sending, by the second forwarding device, the second route update packet to the controller, wherein the type information indicates that the type of the second route update packet is a route deletion type;
when determining that the state of the target link changes from faulty to normal, sending, by the second forwarding device, the second route update packet to the controller, wherein the type information indicates that the type of the second route update packet is the route addition type; or
when determining that the state of the target link changes from normal to faulty, sending, by the second forwarding device, the second route update packet to the controller, wherein the type information indicates that the type of the second route update packet is the route deletion type, wherein the second route update packet of the route addition type instructs the controller to add the second route, and the second route update packet of the route deletion type instructs the controller to delete the second route.

4. The method according to claim 1, wherein:
the target field comprises a state identifier indicating the state of the target link; and
sending, by the second forwarding device, the second route update packet to the controller according to the state of the target link comprises:
when determining that the state of the target link is normal, sending, by the second forwarding device, the second route update packet to the controller, wherein the state identifier is a normal state identifier;

when determining that the state of the target link is faulty, sending, by the second forwarding device, the second route update packet to the controller, wherein the state identifier is a faulty state identifier;

when determining that the state of the target link changes from faulty to normal, sending, by the second forwarding device, the second route update packet to the controller, wherein the state identifier is the normal state identifier; or when determining that the state of the target link changes from normal to faulty, sending, by the second forwarding device, the second route update packet to the controller, wherein the state identifier is the faulty state identifier.

5. The method according to claim 1, wherein:

the target field comprises a bandwidth of the target link; and sending, by the second forwarding device, the second route update packet to the controller according to the state of the target link comprises:

when determining that the state of the target link is normal:
determining, by the second forwarding device, the bandwidth of the target link; and
sending the second route update packet to the controller, wherein the bandwidth of the target link is greater than 0; or when determining that the state of the target link is faulty, sending, by the second forwarding device, the second route update packet to the controller, wherein the bandwidth of the target link comprised in the target field is equal to 0.

6. The method according to claim 5, wherein when the target link is the link aggregation group, determining, by the second forwarding device, the bandwidth of the target link comprises:

determining, by the second forwarding device, member links whose states are normal in the plurality of member links; and determining, by the second forwarding device, that the bandwidth of the target link is equal to a sum of bandwidths of the member links whose states are normal.

7. The method according to claim 1, wherein the target field comprises a bandwidth of the target link; and when the target link is the link aggregation group, sending, by the second forwarding device, the second route update packet to the controller according to the state of the target link comprises:

when determining that the state of the target link is normal and that a member link whose state is normal in the plurality of member links changes, determining, by the second forwarding device, the bandwidth of the target link; and sending, by the second forwarding device, the second route update packet to the controller.

8. The method according to claim 7, wherein determining, by the second forwarding device, the bandwidth of the target link comprises:

determining, by the second forwarding device, member links whose states are normal in the plurality of member links; and determining, by the second forwarding device, that the bandwidth of the target link is equal to a sum of bandwidths of the member links whose states are normal.

9. The method according to claim 1, wherein the first forwarding device belongs to a first autonomous system, the second forwarding device belongs to a second autonomous system, and the first autonomous system is different from the second autonomous system.

10. The method according to claim 1, wherein receiving, by the second forwarding device, the third route update packet sent by the first forwarding device comprises receiving, by the second forwarding device using an External Border Gateway Protocol (EBGP), the third route update packet from the first forwarding device; and sending, by the second forwarding device, the second route update packet to the controller comprises sending, by the second forwarding device, the second route update packet to the controller using an Internal Border Gateway Protocol (IBGP).

11. A device, comprising:

a memory, configured to store a program instruction;

a communications interface, configured to receive and send data; and a processor, configured to invoke the program instruction stored in the memory to perform:

receiving, using the communications interface and from a first forwarding device, a third route update packet, wherein the third route update packet comprises a second attribute indication message and a third route, a prefix of the third route is an identifier of the first forwarding device, and the second attribute indication message instructs the device not to advertise the third route to another forwarding device any longer;

determining a target link, wherein the instructions for determining the target link, further include instructions for:

determining a port for receiving the third route update packet; and performing at least one of:
determining the target link with the port as an endpoint; or
determining that a link with the port as an endpoint is a member link in a link aggregation group, and determine that the target link is the link aggregation group, wherein the link aggregation group comprises a plurality of member links;

monitoring a state of the target link, wherein the target link is a link from the first forwarding device to the device; and sending, by using the communications interface, a second route update packet to a controller according to the state of the target link, wherein the second route update packet comprises a second route and a target field notifying the controller of the state of the target link, and a prefix of the second route is the identifier of the first forwarding device.

12. The device according to claim 11, wherein when the target link is the link aggregation group, the instructions for monitoring the state of the target link further include instructions for:

detecting the state of the target link is normal based on determining that a state of a member link in the link aggregation group is normal; or detecting the state of the target link is faulty based on determining that a respective state of all member links in the link aggregation group are faulty.

13. The device according to claim 11, wherein the target field comprises type information indicating a type of the second route update packet and wherein the instructions for sending, by using the communications interface, the second route update packet to the controller according to the state of the target link, further includes instructions for:
  determining that the state of the target link is normal, and based on determining that the state of the target link is normal, sending the second route update packet to the controller using the communications interface, wherein the type information indicates that the type of the second route update packet is a route addition type;
  determining that the state of the target link is faulty, and based on determining that the state of the target link is faulty, sending the second route update packet to the controller using the communications interface, wherein the type information indicates that the type of the second route update packet is a route deletion type;
  determining that the state of the target link changes from faulty to normal, and based on determining that the state of the target link changes from faulty to normal, sending the second route update packet to the controller by using the communications interface, wherein the type information indicates that the type of the second route update packet is the route addition type; or
  determining that the state of the target link changes from normal to faulty, and based on determining that the state of the target link changes from normal to faulty, sending the second route update packet to the controller by using the communications interface, wherein the type information indicates that the type of the second route update packet is the route deletion type, wherein the second route update packet of the route addition type instructs the controller to add the second route, and the second route update packet of the route deletion type instructs the controller to delete the second route.

14. The device according to claim 11, wherein the target field comprises a bandwidth of the target link, and wherein the instructions for sending, using the communications interface, the second route update packet to the controller according to the state of the target link, based on the target link being the link aggregation group, further includes instructions for:
  determining the bandwidth of the target link based on determining that the state of the target link is normal and that a member link whose state is normal in the target link changes; and
  sending the second route update packet to the controller using the communications interface.

15. The device according to claim 11, wherein:
the instructions for receiving, using the communications interface, the third route update packet sent by the first forwarding device further includes instructions for:
  receiving, using the communications interface and an External Border Gateway Protocol (EBGP), the third route update packet sent by the first forwarding device; and
the instructions for sending the second route update packet to the controller using the communications interface further includes instructions for:
  sending the second route update packet to the controller using the communications interface and an Internal Border Gateway Protocol (IBGP).

* * * * *